(12) United States Patent
Cheon et al.

(10) Patent No.: US 9,914,803 B2
(45) Date of Patent: Mar. 13, 2018

(54) CYANATE RESIN BLENDS AND RADOMES INCLUDING THEM

(71) Applicant: Saint-Gobain Performance Plastics Corporation, Aurora, OH (US)

(72) Inventors: Kapsoo Cheon, Shrewsbury, MA (US); Marie J. Demers, Dover, NH (US); Ajay Padwal, Shrewsbury, MA (US)

(73) Assignee: Saint-Gobain Performance Plastics Corporation, Solon, OH (US)

( * ) Notice: Subject to any disclaimer, the term of this patent is extended or adjusted under 35 U.S.C. 154(b) by 418 days.

(21) Appl. No.: 14/314,059

(22) Filed: Jun. 25, 2014

(65) Prior Publication Data

US 2015/0002364 A1 Jan. 1, 2015

Related U.S. Application Data

(60) Provisional application No. 61/840,911, filed on Jun. 28, 2013.

(51) Int. Cl.
| | |
|---|---|
| *C08G 61/02* | (2006.01) |
| *C08G 67/00* | (2006.01) |
| *C08J 5/24* | (2006.01) |
| *H01Q 1/42* | (2006.01) |
| *C08L 61/14* | (2006.01) |
| *B32B 27/42* | (2006.01) |

(52) U.S. Cl.
CPC ............ *C08G 67/00* (2013.01); *B32B 27/42* (2013.01); *C08J 5/24* (2013.01); *C08L 61/14* (2013.01); *H01Q 1/422* (2013.01); *C08J 2373/00* (2013.01); *C08J 2379/04* (2013.01); *Y10T 442/30* (2015.04); *Y10T 442/60* (2015.04)

(58) Field of Classification Search
CPC ............ H01Q 1/42; C08J 5/12; Y10T 442/30
USPC .......................................................... 528/86
See application file for complete search history.

(56) References Cited

U.S. PATENT DOCUMENTS

| | | | |
|---|---|---|---|
| 5,360,887 | A | 11/1994 | Tsunemi et al. |
| 5,707,723 | A | 1/1998 | Harrison et al. |
| 5,807,967 | A | 9/1998 | Snow et al. |
| 6,107,976 | A | 8/2000 | Purinton |
| 6,245,841 | B1 | 6/2001 | Yeager et al. |

(Continued)

FOREIGN PATENT DOCUMENTS

| | | | | |
|---|---|---|---|---|
| EP | 1439209 | A1 | 7/2004 | |
| JP | 10273532 | | * 10/1998 | ........... C07D 251/34 |

(Continued)

OTHER PUBLICATIONS

International Search Report and Written Opinion from related International Application No. PCT/US2014/044211, dated Oct. 28, 2014, 30 pages.

(Continued)

*Primary Examiner* — Shane Fang
(74) *Attorney, Agent, or Firm* — McDonnell Boehnen Hulbert & Berghoff LLP

(57) ABSTRACT

Certain embodiments are directed to cyanate resin blends comprising, for example, a mixture of a cyanate monomer and a cyanate oligomer. The resin blends are effective to provide a dielectric constant of less than 2.7, a glass transition temperature of at least 150° C. and a moisture absorption of less than 1.5%. Radomes using the resin are also described.

7 Claims, 3 Drawing Sheets

(56) References Cited

U.S. PATENT DOCUMENTS

| | | | |
|---|---|---|---|
| 7,153,792 | B2 | 12/2006 | Sahlin et al. |
| 2005/0024289 | A1 | 2/2005 | Fredberg et al. |

FOREIGN PATENT DOCUMENTS

| | | | |
|---|---|---|---|
| JP | 2000-319509 | A | 11/2000 |
| JP | 2009155654 | A | 7/2009 |
| JP | 2011006683 | A | 1/2011 |
| WO | WO 96/20242 | | 7/1996 |
| WO | 2010/136703 | A1 | 12/2010 |

OTHER PUBLICATIONS

Han et al. (Composites Part A: Applied Science and Manufacturing 41(9):1321-28 (2010).
Supplementary European Search Report from related European Application No. 14817128.3, dated Feb. 10, 2017, 11 pages.

\* cited by examiner

CYANATE RESIN BLENDS AND RADOMES INCLUDING THEM

TECHNOLOGICAL FIELD

This application is related to resin blends. More particularly, certain embodiments described herein are directed to cyanate resin blends suitable for use in many instances such as, for example, a radome and systems including radomes.

BACKGROUND

A radome is a structure that encloses and protects an antenna. The structure is generally weatherproof and protects the underlying antenna from the elements, from being contacted by personnel or from damage from external factors such as wind or temperature.

SUMMARY

In some aspects, a radome comprising a plurality of plies coupled to each other is provided. In some embodiments, at least one of the plurality of plies comprises a substrate and a cured resin blend produced from an effective amount of a cyanate monomer and an effective amount of a cyanate ester oligomer to provide a dielectric constant of less than 2.7, a glass transition temperature of at least 150° C., in particular at least 175° C. and a moisture absorption of less than 1.5% for the radome. In certain instances, the radome may further comprise a loss tangent of less than 0.004.

In some examples, the monomer of the radome is one or more of a compound of formula (I)-(IV)

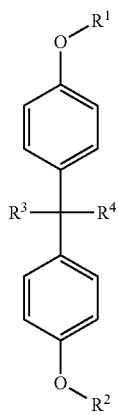

(I)

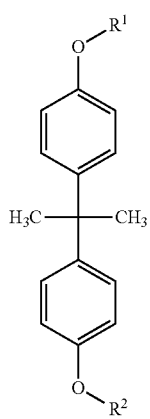

(II)

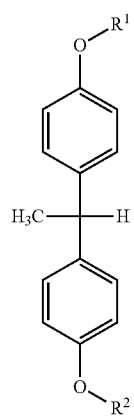

(III)

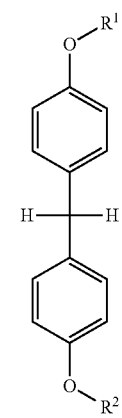

(IV)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl and wherein $R^3$ and $R^4$ of formula (I) are independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

In other embodiments, the monomer may comprise one or more of a compound having a formula (V)-(IX)

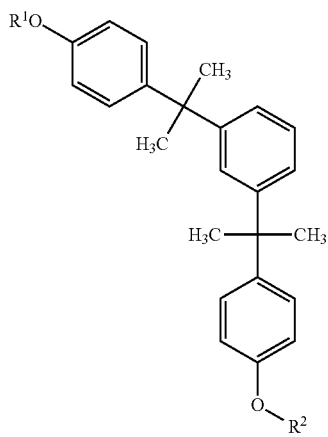

(V)

-continued

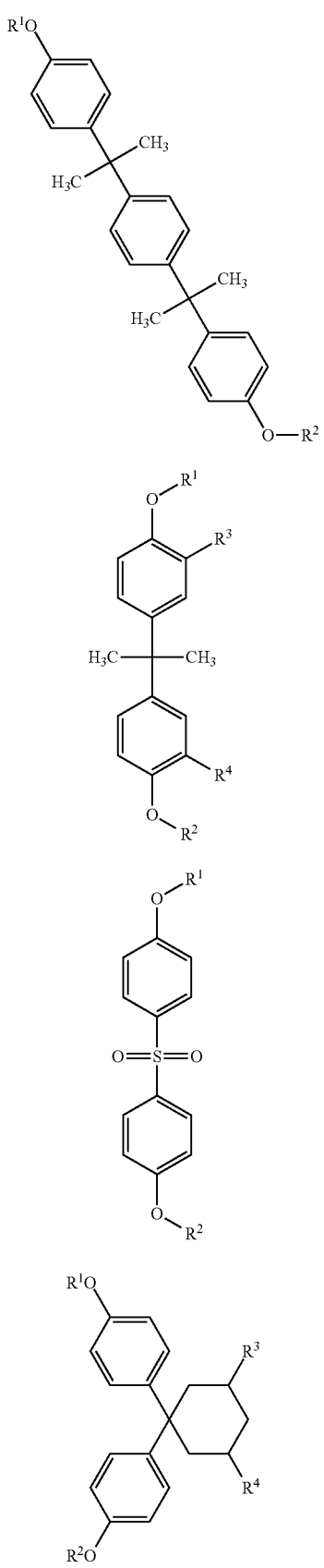

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl, and wherein $R^3$ and $R^4$ of formula (VII) and (IX) are independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. In other instances, the monomer may be selected from dicyclopentadienyl bisphenol cyanate ester monomers.

In certain instances, the oligomer is a cyanate ester oligomer comprising two or more monomeric units each selected from a compound having the formula (I)-(IX) or at least one dicyclopentadienyl bisphenol cyanate ester monomer. In some embodiments, the cyanate monomer comprises a bisphenol dicyanate group and the cyanate ester oligomer comprises a diphenylcyanate group. In other embodiments, the monomer is present from about 30-70 weight percent and the oligomer is present from about 70-30 weight percent (where the weight percent of the two resins adds to 100 weight percent). In some examples, the resin blend may comprise at least one phenol added to the resin blend. In other examples, the resin blend may comprise at least one metal catalyst, e.g., an acetylacetonate catalyst, added to the resin.

In certain configurations, the substrate of the radome comprises one or more of a woven fabric, a non-woven fabric, a ceramic, a plastic, a glass, a fiberglass, a nylon, a polyester, a polyethersulfone, an aramid, a polyethylene, a polypropylene, a polyolefin, a polyimide, a polyamide, a polyamide-imide, a polyphenylene sulfide, a carbon, a carbon black, a graphite, a diamond, a polybenzimidazole, a polybenzoxazole or a halocarbon.

In some embodiments, the effective amount of the monomer by weight exceeds the effective amount of the oligomer by weight. In some instances, the radome further comprises a loss tangent of less than 0.004. In additional instances, the radome may comprise an insulation material disposed on the inner surface of the radome.

The radomes, prepregs and the resins described herein can include one or more toughening agents, such as thermoplastics (e.g. polysulfone, polyethersulfone, polyimide, polyethers, polyphenylene ethers, polyarylates), elastomers (e.g. copoly butadiene-acrylonitrile, polysiloxanes), and core-shell rubbers (CSR).

In an additional aspect, a radome comprising a plurality of plies coupled to each other, in which at least one of the plurality of plies comprises a substrate and a cured resin produced from an effective amount of a cyanate monomer selected from monomers of formula (I)-(IX) and dicyclopentadienyl bisphenol cyanate ester monomers to provide a dielectric constant of less than 2.7, a glass transition temperature of at least 150° C., in particular at least 150° C., in particular at least 175° C. and a moisture absorption of less than 1.5% for the radome.

In another aspect, a prepreg comprising a plurality of plies coupled to each other, in which at least one of the plurality of plies comprises a substrate and a resin blend comprising an effective amount of a cyanate monomer and an effective amount of a cyanate ester oligomer to provide a cured resin comprising a dielectric constant of less than 2.7, a glass transition temperature of at least 150° C., in particular at least 175° C. and a moisture absorption of less than 1.5%. In some embodiments, the monomer of the prepreg may comprise any of those monomers of formula (I)-(IX) as noted herein. In some embodiments, the oligomer is a cyanate ester oligomer comprising two or more monomeric units each selected from a compound having the formula (I)-(IX) or dicyclopentadienyl bisphenol cyanate ester monomers. In some embodiments, the prepreg comprises a bisphenol dicyanate group and the cyanate ester oligomer comprises a diphenylcyanate group. In additional examples, the monomer is present from about 30-70 weight percent and the oligomer is present from about 70-30 weight percent (where the weight percent of the two resins adds to 100 weight percent). In some examples, at least one phenol added to the resin blend of the prepreg. In other examples, at least one metal catalyst, e.g., an acetylacetonate catalyst, added to the resin blend of the prepreg.

In certain configurations, the substrate of the prepreg comprises one or more of a woven fabric, a non-woven fabric, a ceramic, a plastic, a glass, a fiberglass, a nylon, a polyester, a polyethersulfone, an aramid, a polyethylene, a polypropylene, a polyolefin, a polyimide, a polyamide, a polyamide-imide, a polyphenylene sulfide, a carbon, a carbon black, a graphite, a diamond, a polybenzimidazole, a polybenzoxazole or a halocarbon.

In some embodiments, the effective amount of the monomer by weight in the prepreg exceeds the effective amount of the oligomer by weight in the prepreg. In other embodiments, the prepreg further comprises a loss tangent of less than 0.004. In some instances, the prepreg may comprise a covering coupled to at least one of the plies of the prepreg.

In some aspects, a prepreg comprises a plurality of plies coupled to each other, in which at least one of the plurality of plies comprises a substrate and a resin comprising an effective amount of a cyanate monomer selected from monomers of formula (I)-(IX) and dicyclopentadienyl bisphenol cyanate ester monomers to provide a cured resin comprising a dielectric constant of less than 2.7, a glass transition temperature of at least 150° C., in particular at least 175° C. and a moisture absorption of less than 1.5%.

In another aspect, a resin blend comprising an effective amount of a cyanate ester monomer and an effective amount of a cyanate ester oligomer to provide a cured resin comprising a dielectric constant of less than 2.7, a loss tangent of less than 0.004, a glass transition temperature of at least 150° C., in particular at least 175° C. and a moisture absorption of less than 1.5% is described. In other aspects, the resin blend may comprise an effective amount of at least two cyanate monomers and an effective amount of a cyanate ester oligomer to provide a cured resin comprising a dielectric constant of less than 2.7, a loss tangent of less than 0.004, a glass transition temperature of at least 150° C., in particular at least 175° C. and a moisture absorption of less than 1.5%. The monomers and oligomers of the resin blend may be any of those monomers described herein, e.g., the monomers may comprise a compound of formula (I)-(IX) or dicyclopentadienyl bisphenol cyanate ester monomer, and the oligomer may comprise two or more monomeric units where at least one of the monomeric units comprises a monomer of formula (I)-(IX).

In an additional aspect, a resin comprises an effective amount of a cyanate ester monomer selected from monomers of formula (I)-(IX) and dicyclopentadienyl bisphenol cyanate ester monomers to provide a cured resin comprising a dielectric constant of less than 2.7, a loss tangent of less than 0.004, a glass transition temperature of at least 150° C., in particular at least 175° C. and a moisture absorption of less than 1.5%.

In some aspects, a system comprising a radome as described herein and an electronic device covered by the radome is provided. In some instances, the electronic device comprises an antenna, is part of a radar or sonar system, or is part of a communication system. In other instances, the radome is sized and arranged to be placed on an aircraft, a ship, a hull of a ship, e.g., immersed in the water during operation of the ship or above the water surface during operation of the ship. Where the electronic device takes the form of a communication system, the communication system may be selected from the group consisting of Wi-Fi systems, Bluetooth systems, radio systems, cellular communication systems and satellite systems.

In other aspects, a satellite comprising a transmitter/receiver and a radome as described herein is disclosed. In additional aspects, an automotive vehicle comprising a transmitter/receiver configured to couple to a bumper of the vehicle, the vehicle further comprising a radome as described herein is provided. In some aspects, an aircraft comprising a radar system and a radome as described herein is provided. In some instances, the radar system is positioned in a nose cone or an undersurface of the aircraft. In other aspects, a ship comprising a radar system and a radome as described herein is provided. In some instances, the radar system is positioned external to the hull of the ship and beneath the water surface in operation of the ship. In other instances, a submarine comprising a sonar system and a radome as described herein is provided. In some embodiments, the sonar system is positioned external to the hull of the submarine.

In other aspects, a method of producing a radome comprises disposing a resin blend as described herein on a substrate, and polymerizing the disposed resin to provide a radome comprising a dielectric constant of less than 2.7, a glass transition temperature of at least 150° C., in particular at least 175° C. and a moisture absorption of less than 1.5%. In some embodiments, polymerizing the disposed resin also provides a radome with a loss tangent of less than 0.004. In some instances, the polymerizing step comprises permitting the resin to polymerize by ring opening metathesis polymerization at a first temperature for a first period and then completing polymerization of the resin at a second temperature, higher than the first temperature, for a second period. In certain examples, the method may comprise adding at least one additive to the resin before or after polymerization of the resin. In other examples, the additive is a flame retardant, a smoke suppressant or a pigment.

Additional features, aspect, examples and embodiments are described in more detail below.

BRIEF DESCRIPTION OF THE FIGURES

Certain embodiments are described with reference to the accompanying figures in which.

Figure 1:
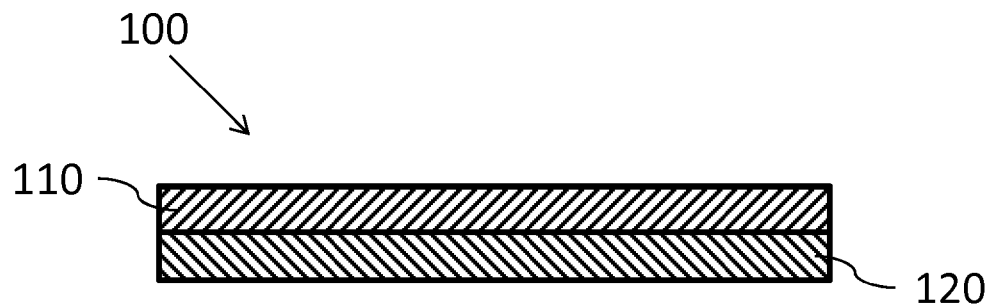
FIG. 1 is an illustration of a prepreg comprising a plurality of plies.

It will be recognized by the person of ordinary skill in the art, given the benefit of this disclosure, that certain dimensions or features in the figures may have been enlarged, distorted or shown in an otherwise unconventional or non-proportional manner to provide a more user friendly version of the figures. Reference to front, back, top and bottom are provided for exemplary purposes and are not limiting.

DETAILED DESCRIPTION

Certain embodiments are described below with reference to singular and plural terms in order to provide a user friendly description of the technology disclosed herein. These terms are used for convenience purposes only and are not intended to limit the materials and structures described herein as including or excluding certain features unless otherwise noted as being present in a particular embodiment described herein.

In certain configurations, the radomes described herein generally comprise a substrate with a resin impregnated, added to or otherwise present in or on the substrate. The substrate may be produced by disposing a plurality of individual plies or layers on each other and coupling the plies together and/or molding or forming the plies to a desired shape to provide an article with desirable physical properties, e.g., to permit use of the article as a radome that may comprise one or more of the following attributes: (1) a dielectric constant at 10 GHz (or other selected frequency, e.g., 1 MHz, 10 MHz, etc. as measured by ASTM 2520 dated 2013) of less than or equal to 2.7, more particularly a dielectric constant of less than or equal to 2.6, 2.5 or even 2.4, (2) a water absorption (as measured by ASTM D570-98) of less than or equal to 1.5%, more particularly, less than or equal to 1.4%, 1.3%, 1.25%, 1.1%, 1% or even less than or equal to 0.75% and/or (3) a glass transition temperature of at least 150° C., more particularly at least 175° C., as measured by ASTM D3418-03. In some embodiments, the radomes described herein may comprise a loss tangent (as measured by ASTM 2520) of less than or equal 0.004, more particularly, less than or equal to 0.003, 0.00275, 0.0025 or even less than or equal to 0.00225. Unless otherwise specified, reference to dielectric constant and loss tangent in the description below and the claims appended hereto refer to values obtained using the ASTM 2520 test noted above. While described more specifically in the ASTM 2520 protocol, the dielectric strength was generally measured using cavity perturbation methods and a rectangular waveguide. The sample is placed between plates of the waveguide to measure the dielectric properties. Similarly, reference to moisture or water absorption values refer to those values obtained using ASTM D570-98. While described more specifically in the ASTM D570-98 protocol, the moisture absorption was generally measured by drying disk specimens in an oven for a specified time and temperature and then placing them in a desiccator to cool. Immediately upon cooling the specimens are weighed. The material is then emerged in water at a specified temperature, e.g., 23° C. for 24 hours or until equilibrium. Specimens are removed, patted dry with a lint free cloth, and weighed to determine the amount of water absorbed. Glass transition temperature may also be measured by suitable ASTM tests such as, for example, ASTM D3418-03. The resins described herein are generally considered thermoset or thermosetting resins so the cured article can withstand environmental conditions commonly encountered by radomes, though in certain instances one or more thermoplastic materials may be present in certain areas, layers or parts of the articles.

In certain embodiments, the resins used herein to produce the radomes may comprise an effective amount of monomer blended with an effective amount of an oligomer. For example, in some embodiments, the resin may comprise a major amount of the monomer and a minor amount of the oligomer. The terms "major" and "minor" refer to the amount, by weight, of the monomer and oligomer. For example, where a monomer and an oligomer are present, a major amount of the monomer would be present when the weight percentage of the monomer exceeds the weight percentage of the oligomer. In some instances, the monomer may be present in an amount that exceeds 50 weight percent based on the weight of the monomer and the oligomer. As noted below, by producing blends with effective amounts of a monomer and an oligomer, desirable properties can be achieved to render the resins suitable for use in radomes and other similar applications.

In certain examples, the monomer for use in the resin blends described herein may not provide desirable properties when polymerized with itself or with another monomer. For example, by itself the monomer may provide a resin having a high dielectric constant or high water absorption, but when the monomer is combined with an oligomer and the mixture is polymerized, the resulting resin provides desirable properties. In some instances, the monomer used in the resin blends described herein may be a cyanate ester. In certain embodiments, the monomer may comprise a compound of formula (I)

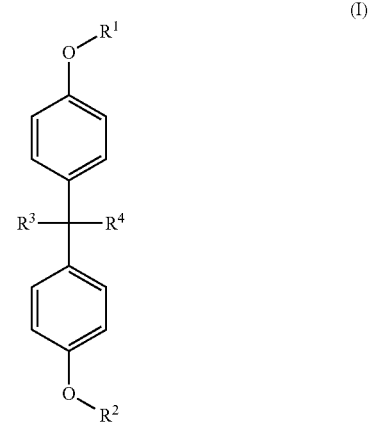

where $R^1$ and $R^2$ are each independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. R3 and R4 are each independently selected from hydrogen, methyl, phenyl, trifluoromethyl, ethyl, dichloroethylene, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms. In some instances, one of $R^1$ and $R^2$ is —CN and the other group of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, and a halohydrocarbonyl group comprising 1 to 6 carbon atoms, and $R^3$ and $R^4$ are each independently hydrogen, methyl, phenyl or trifluoromethyl. In some instances, each of $R^3$ and $R^4$ may be hydrogen or may be methyl or may be phenyl. In certain embodiments, the monomer may comprise a compound of formula (II)

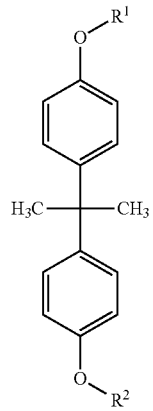

(II)

where $R^1$ and $R^2$ are each independently selected from independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. In some embodiments, at least one of $R^1$ and $R^2$ is —CN and the other group is selected from independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. In some instances, each of $R^1$ and $R^2$ of formula (II) is —CN. In other instances, the monomer used in the resin blends described herein may comprise a compound of formula (III)

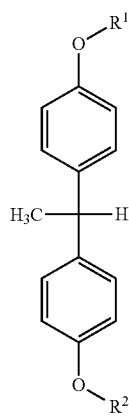

(III)

where $R^1$ and $R^2$ are each independently selected from independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. In some embodiments, at least one of $R^1$ and $R^2$ is —CN and the other group is selected from independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. In some instances, each of $R^1$ and $R^2$ of formula (III) is —CN. In other configurations, the monomer used in the resin blends described herein is a compound of formula (IV)

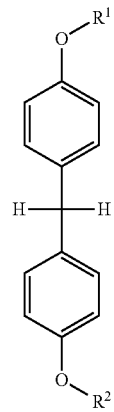

(IV)

where $R^1$ and $R^2$ are each independently selected from independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. In some embodiments, at least one of $R^1$ and $R^2$ is —CN and the other group is selected from independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. In certain instances, each of $R^1$ and $R^2$ of formula (IV) is —CN. In other configurations, the monomer used in the resin blends described herein is a compound of formula (V)

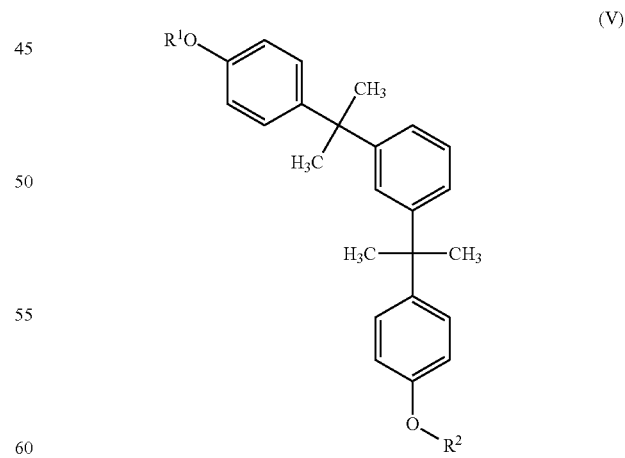

(V)

where $R^1$ and $R^2$ are each independently selected from independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. In some embodiments, at least one of R¹ and R² is —CN and the other group is selected from independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. In certain instances, each of R¹ and R² of formula (V) is —CN. In other configurations, the monomer used in the resin blends described herein is a compound of formula (VI)

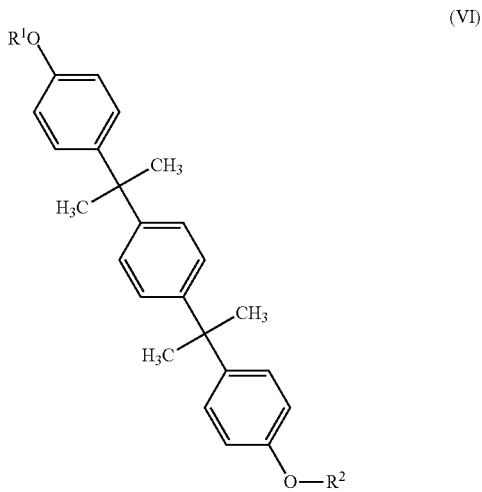

(VI)

where R¹ and R² of formula (VI) are each independently selected from independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. In some embodiments, at least one of R¹ and R² of formula (VI) is —CN and the other group is selected from independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. In certain instances, each of R¹ and R² of formula (VI) is —CN. In other configurations, the monomer used in the resin blends described herein is a compound of formula (VII)

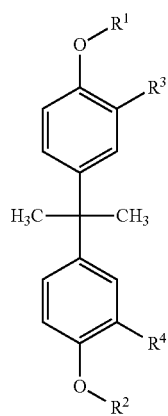

(VII)

where R¹, R², R³ and R⁴ of formula (VII) are each independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. In some embodiments, at least one of R¹, R², R³ and R⁴ of formula (VII) is —CN and the other groups are independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. In certain instances, each of R¹ and R² of formula (VII) is —CN and R³ and R⁴ are each independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. In some instances, R³ and R⁴ are each independently phenyl or isopropyl. In other embodiments, the monomer used in the resin blends described herein is a compound of formula (VIII)

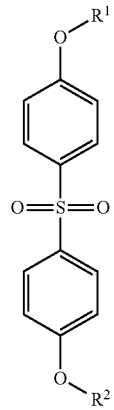

(VIII)

where R¹ and R² of formula (VIII) are each independently selected from independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. In some embodiments, at least one of R¹ and R² of formula (VII) is —CN and the other group is selected from independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. In certain instances, each of R¹ and R² of formula (VIII) is —CN. In other embodiments, the monomer used in the resin blends described herein is a compound of formula (IX)

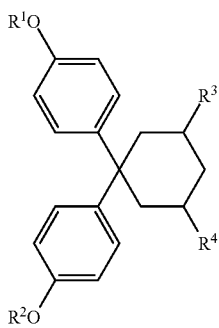

(IX)

where $R^1$, $R^2$, $R^3$ and $R^4$ of formula (IX) are each independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. In some embodiments, at least one of $R^1$, $R^2$, $R^3$ and $R^4$ of formula (IX) is —CN and the other groups are selected from independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. In certain instances, each of $R^1$ and $R^2$ of formula (VII) is —CN and $R^3$ and $R^4$ are each independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl. In some instances, $R^3$ and $R^4$ are each independently hydrogen, methyl, ethyl, propyl or isopropyl.

In some embodiments, commercially available monomers suitable for use in the resin blends described herein may include AroCy B-10 Monomeric Bisphenol-A Dicyanate, AroCy B-30 Prepolymer Bisphenol-A Dicyanate, AroCy B-40S Prepolymer Bisphenol-A Dicyanate, AroCy M-10 Monomeric Bisphenol F Dicyanate, AroCy M-20 Monomeric Bisphenol F Dicyanate and AroCy M-30 Bisphenol Dicyanate Prepolymer, each of which is commercially available from Huntsman (The Woodlands, Tex.). Other suitable monomers are commercially available, for example, from Cytec Industries (Woodland Park, N.J.) and Sigma-Aldrich (St. Louis, Mo.). In some embodiments, the resin blends provided herein comprise a monomer of formula (I)-(IX) where at least one of the monomers of the resins comprises a cyanato group, e.g., —CN, cyanatophenyl, diphenylcyanate or other suitable compounds with a —CN group. In other instances, the monomer may be one or more materials commercially available from Lonza (Switzerland) such as, for example, dicyclopentadienyl bisphenol cyanate ester. In some embodiments, the monomer may be a cyanate ester derivative of norbornene, dicyclopentadiene, 5-methyl-2-norbonene, 5-ethyl-2-norbornene, 5-ethylene-2-norbornene, 5-propyl-2-norbonene, 5-butyl-2-norbonene, 5-pentanyl-2-norbonene, 5-hexyl-2-norbonene, 5-cyclohexyl-2-norbonene, 5-septyl-2-norbonene, 5-octyl-2-norbonene, 5-nonyl-2-norbonene, 5-decyl-2-norbonene, 5-ethylene-5-chloro-2-norbornene, 5-propyl-5-chloro-2-norbonene, 5-butyl-5-chloro-2-norbonene, 5-pentanyl-5-chloro-2-norbonene, 5-hexyl-5-chloro-2-norbonene, 5-cyclohexyl-5-chloro-2-norbonene, 5-septyl-5-chloro-2-norbonene, 5-octyl-5-chloro-2-norbonene, 5-nonyl-5-chloro-2-norbonene, 5-decyl-5-chloro-2-norbonene, 5-methyl-5-bromo-2-norbornene, 5-ethylene-5-bromo-2-norbornene, 5-propyl-5-bromo-2-norbonene, 5-butyl-5-bromo-2-norbonene, 5-pentanyl-5-bromo-2-norbonene, 5-hexyl-5-bromo-2-norbonene, 5-cyclohexyl-5-bromo-2-norbonene, 5-septyl-5-bromo-2-norbonene, 5-octyl-5-bromo-2-norbonene, 5-nonyl-5-bromo-2-norbonene, 5-decyl-5-bromo-2-norbonene, methyl 5-norbornene-2-carboxylate, ethyl 5-norbornene-2-carboxylate, phenyl 5-norbornene-2-carboxylate, methyl 2-methyl-5-norbornene-2-carboxylate, butyl 3-phenyl-5-norbornene-2-carboxylate, dimethyl 5-norbornene-2,3-dicarboxylate, cyclohexyl 5-norbornene-2-carboxylate, allyl 5-norbornene-2-carboxylate, 5-norbornene-2-yl acetate, 5-norbornene-2-nitrile, 3-methyl-5-norbornene-2-nitrile, 2,3-dimethyl-5-norbornene-2,3-dinitrile, 5-norbornene-2-carboxylic acid amide, N-methyl-5-norbornene-2-carboxylic acid amide, N,N-diethyl-5-norbornene-2-carboxylic acid amide, N,N,N',N'-tetramethyl-5-norbornene-2,3-dicarboxylic acid diamide, 5-chloro-2-norbornene, 5-bromo-2-norbornene, 5-fluoro-2-norbornene, 5-methyl-5-chloro-2-norbornene, chloroethyl 5-norbornene-2-carboxylate, dibromopropyl 5-norbornene-2-carboxylate, dichloropropyl 5-norbornene-2-carboxylate, monochlorophenyl 5-norbornene-2-carboxylate, monobromophenyl 5-norbornene-2-carboxylate, tribromophenyl 5-norbornene-2-carboxylate, 2,3-dichloro-5-norbornene, 2-bromo-5-norbornene, 2-bromomethyl-5-norbornene, tribromobenzyl 5-norbornene-2-carboxylate, 5-norbornene-2,3-dicarboxylic anhydride, 2,3-dimethyl-5-norbornene-2,3-dicarboxylic anhydride, 5-norbornene-2,3-dicarboxylic acid imide, N-phenyl-2-methyl-5-norbornene-2,3-dicarboxylic acid imide, 2-trichlorosilyl-5-norbornene, 2-(dimethylmethoxysilyl)-5-norbornene, 2-(dimethylacetylsilyl)-5-norbornene, and 2-trimethylsilyl-5-norbornene.

In some embodiments, certain monomers described herein may be polymerized to provide a suitable resin for use in a radome. For example, certain cyanato or dicyanato monomers can be polymerized in the absence of an oligomer to provide a suitable resin, e.g., a resin with a dielectric constant at 10 GHz (as measured by ASTM 2520) of less than or equal to 2.7, more particularly a dielectric constant of less than or equal to 2.6, 2.5 or even 2.4, (2) a water absorption (as measured by ASTM D570-98) of less than or equal to 1.5%, more particularly, less than or equal to 1.4%, 1.3%, 1.25%, 1.1%, 1% or even less than or equal to 0.75% and/or (3) a glass transition temperature of at least 150° C., more particularly at least 150° C., in particular at least 175° C., as measured by ASTM D3418-03. Any of the monomers of formula (I)-(IX) may be polymerized in the absence of a monomer, and illustrative monomers of formula (I)-(IX) are those where one or both of $R^1$ and $R^2$ are —CN.

In certain embodiments, the monomers described herein may be combined with each other and with an oligomer to provide the resin blend. In some examples, two or more monomers each of formulae (I)-(IX) (or the other monomers described herein) may be combined with an oligomer. In some instances, the monomers may have the same general formula, e.g., may both be a compounds of formula (I) but have different groups for at least one of $R^1$ and $R^2$, whereas in other examples the two monomers may have a different formula, e.g., one monomer may be a compound of formula (I) and the other monomer may be a compound of formula (IX). Many different combinations where two different monomers of formulae (I)-(IX) can be combined and will be selected by the person of ordinary skill in the art, given the benefit of this disclosure.

In certain examples, the resins blends described herein also comprise one or more oligomers. In certain instances, one monomeric unit from formulae (I)-(IX) and another monomeric unit of formula (I)-(IX) are present in the oligomer. If desired, the monomeric unit may be one of the other monomeric units described herein. In some instances, the oligomer may comprise at least one similar monomeric unit, whereas in other instances the oligomer may comprise all different monomeric units. In some embodiments, at least one monomeric unit of the oligomer comprises a —CN group. In certain embodiments, the oligomer comprises three or more monomeric units independently selected from monomeric units with formulae (I)-(IX). For example, the oligomer may comprise three monomeric units of formula (I), three monomeric units of formula (II), three monomeric units of formula (III), etc. In some instances, two of the three monomeric units may be the same, whereas in other instances all three monomeric units of the oligomer may be different. While specific configurations of two and three monomeric unit oligomers are described herein, it will be recognized by the person of ordinary skill in the art, given the benefit of this disclosure, that oligomers comprising four, five, or six monomeric units may also be used.

In some instances and for illustration purposes only, the oligomer may comprise a monomer having a general formula (II) as shown in formula (X)

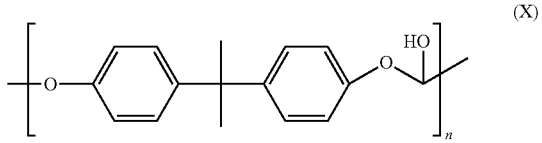

where n is 2, 3, 4, 5 or 6 or higher than 6. In some embodiments, n is 2 or 3. While a monomer of formula (II) is shown for illustration, any one or more monomers with formulae (I)-(IX) may be present in the oligomer. In addition, the exact species bound to the monomeric unit will depend on the particular other reactants present in the resin blend.

In some examples, the resin blends may comprise two or more different oligomers in combination with one or more monomers. For example, two different oligomers may be combined with a single monomer and permitted to polymerize in the presence of a catalyst. In other instances, a single oligomer may be combined with two different monomers and permitted to polymerize in the presence of a catalyst. In certain examples, the resin blend may be produced by first combining a first oligomer and a first monomer during a first period to permit polymerization and then adding a second, different monomer to the mixture for a second period to permit polymerization. In other instances, the resin blend may be produced by first combining a first oligomer, a second oligomer (different from the first) and a first monomer during a first period to permit polymerization and then adding a second, different monomer to the mixture for a second period to permit polymerization. In additional instances, the resin blend may be produced by first combining a first oligomer, a first monomer and a second monomer (different from the first) during a first period to permit polymerization and then adding a second, different oligomer to the mixture for a second period to permit polymerization.

In certain instances, the resin blends described herein may comprise an effective amount of each of the monomer and the oligomer to provide a resin with desirable physical properties for use in radomes and other similar applications. For example, the resin blend may comprise (1) a dielectric constant at 10 GHz (as measured by ASTM 2520) of less than or equal to 2.7, more particularly a dielectric constant of less than or equal to 2.6, 2.5 or even 2.4, (2) a water absorption (as measured by ASTM D570-98) of less than or equal to 1.5%, more particularly, less than or equal to 1.4%, 1.3%, 1.25%, 1.1%, 1% or even less than or equal to 0.75% and/or (3) a glass transition temperature of at least 150° C., more particularly at least 150° C., in particular at least 175° C., as measured by ASTM D3418-03. In some embodiments, the resin blends described herein may comprise a loss tangent (as measured by ASTM 2520) of less than or equal 0.004, more particularly, less than or equal to 0.003, 0.00275, 0.0025 or even less than or equal to 0.00225. The resins blends described herein are generally considered thermoset or thermosetting resins so the cured article can withstand environmental conditions commonly encountered by radomes, though in certain instances one or more thermoplastic materials may be present in certain areas, layers or parts of the articles. In some embodiments, the effective amount of the monomer, by weight percent, may generally exceed the effective amount of the oligomer, by weight percent. For example, the monomer may be added to the resin blend in about 50-70 weight percent with the balance of the blend comprising the oligomer, e.g., the oligomer may be present from about 30-50 weight percent. In other instances, the monomer may be present in about 60-90 weight percent and the oligomer may be present from about 10-40 weight percent. In some embodiments where more than a single monomer is present, the combined weight percentages of the monomer may be selected to exceed the weight percentage of the oligomer. For example, the combined weight percentages of the two monomers may be greater than 50 weight percent.

In certain instances, suitable oligomers can be obtained (or produced) from materials commercially available, for example, from Cytec Industries (Woodland Park, N.J.) and Sigma-Aldrich (St. Louis, Mo.). In some embodiments, the resin blend comprises an oligomer of AroCy cyanate ester such as, for example, AroCy XU 378, XU 71787.02L, XU 7187.07L or other comparable cyanate ester materials. In some instances, the resin blends provided herein comprise an oligomer where the oligomer comprises one, two or three cyanato group, e.g., —CN, cyanatophenyl, diphenylcyanate or other suitable compounds with a —CN group.

In certain embodiments, the resin blends described herein may comprise two or more different resin blends. For example, a first resin blend can be produced using a first monomer and a first oligomer and a second resin blend can be produced using a second monomer and a second oligomer. The different resin blends may be permitted to polymerize for a first period and then combined together to complete polymerization or curing of the resin. In some instances, the first and second resin blend may combined with each other and then disposed on a substrate as described herein.

In some embodiments, the resin blends described herein can be used in combination with other materials. For example, one or more additional materials may be present in the resins produced using the cyanate esters described herein. Illustrative additional materials include, but are not limited to, pigments, carbon black, natural rubber, silicone rubber, urethane rubber, a urethane, a polyurethane, polyvinyl chloride, polyvinylidene chloride, polyvinyl alcohol, and their copolymers with acrylic acid or acrylic acid esters or other vinyl ester monomers, fluoropolymers, including fluoroplastics (such as PTFE, FEP, TFA, ETFE, THV, etc.) and fluoroelastomers, some other polymeric material, or blends thereof. Where fluoropolymers are present, monomers of chlorotrifluoroethylene (CTFE) and vinylidene fluoride (VF2), either as homopolymers, or as copolymers with TFE, HFP, PPVE, PMVE and ethylene or propylene can be used. Additionally, the fluoropolymer may comprise a perfluoropolymer such as homopolymers and copolymers of tetrafluoroethylene (TFE), hexafluoropropylene (HFP) and fluorovinyl ethers, including perfluoropropyl and perfluoromethyl vinyl ether.

In certain embodiments, one or more of the resins described above may be used along with a suitable substrate to provide a prepreg or cured article. While the exact properties of the resin, prepreg and cured article may differ, in some instances, the prepreg may include one or more of the following physical properties (1) a dielectric constant at 10 GHz MHz (as measured by ASTM 2520) of less than or equal to 2.7, more particularly a dielectric constant of less than or equal to 2.6, 2.5 or even 2.4, (2) a loss tangent (as measured by ASTM 2520) of less than or equal 0.003, more particularly, less than or equal to 0.00275, 0.0025 or even less than or equal to 0.00225, and (3) water absorption (as measured by ASTM D570-98) of less than or equal to 1.5%, more particularly, less than or equal to 1.4%, 1.3%, 1.25%, 1.1%, 1% or even less than or equal to 0.75%. In other embodiments, the cured article desirably comprises one or more of the following physical properties: (1) a dielectric constant at 10 GHz (as measured by ASTM 2520) of less than or equal to 2.7, more particularly a dielectric constant of less than or equal to 2.6, 2.5 or even 2.4, (2) a loss tangent (as measured by ASTM 2520) of less than or equal 0.003, more particularly, less than or equal to 0.00275, 0.0025 or even less than or equal to 0.00225, and (3) water absorption (as measured by ASTM D3418-03) of less than or equal to 1.5%, more particularly, less than or equal to 1.4%, 1.3%, 1.25%, 1.1%, 1% or even less than or equal to 0.75%.

In certain embodiments and referring to FIG. 1, a prepreg 100 is shown that comprises two plies 110 and 120. Each of the plies 110, 120 may be the same or may be different. In some embodiments, at least one of the plies 110, 120 comprises one or more of the resins described herein. For example, one of the plies 110, 120 may include a resin blend, as described herein, in a pre-polymerized form. A catalyst may be present in combination with the resin blends if desired. The plies 110, 120 may each comprise yarns or fiber oriented in a desired manner as described, for example, in commonly assigned U.S. Pat. No. 7,153,792, the entire disclosure of which is incorporated herein by reference. In preparing the prepreg, the components of the resins described herein can be mixed or combined and the mixture can be coated onto, disposed into, impregnated with or otherwise added to each of the plies 110, 120, e.g., each of the plies can be dipped into a solution or mixture comprising the resin blend. A catalyst may then be added to the plies. In other instances, the resin may first be formed and then added to the plies. For example, the resin may first be formed and each of the plies may be dipped into the resin to add the resin to the plies. Each of the plies 110, 120 may be coupled to each other by disposing one ply on the other ply, and the resulting prepreg may be cured to provide a cured article. Examples of curing processes are described in more detail below. Prior to curing, the prepreg 100 may be shaped or formed into a desired shape with a desired size, e.g., a dome shape effective to cover an antenna or communication structure. Illustrative shaping and forming methods are described herein below.

Figure 2:
FIG. 2 is another illustration of a prepreg comprising a plurality of plies where two of the plies comprise different materials.

In some configurations, the article may comprise three or more plies each laid on each other and cured to provide the article. Referring to FIG. 2, a prepreg 200 comprising three plies 210, 220 and 230 is shown. The composition of the ply 220 is different from that of the plies 210 and 230. For example, the resins of the three plies 210, 220 and 230 may be the same, but the substrate present in ply 220 may be different. In other instances, the substrates in the plies 210, 220 and 230 may be the same, but the resin present in the ply 220 may be different. In additional configurations, the resin and the substrate in the ply 220 may be different than that in the plies 210 and 230. In some instances, the resins and substrates present in each of the plies 210, 220 and 230 may be the same, but the thickness of the substrates or the amount of resin present may be different in one of the plies. Other configurations using three or more plies where one of the plies is physically or chemically different will be selected by the person of ordinary skill in the art, given the benefit of this disclosure.

Figure 3:
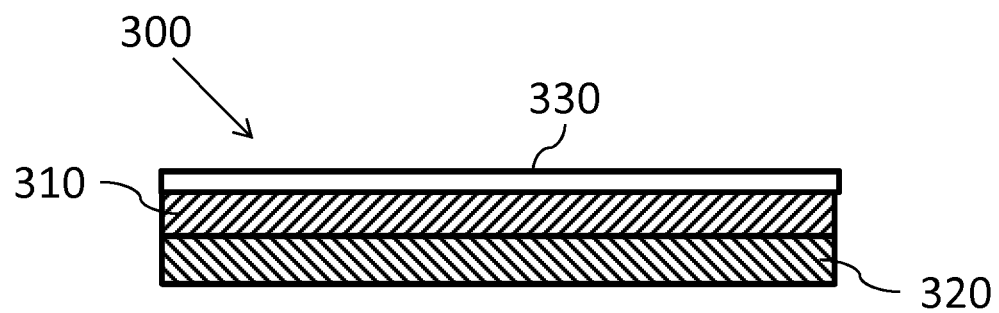
FIG. 3 is an illustration of a prepreg comprising a protective layer or covering.

In certain instances, the prepregs may comprise one or more additional layers or materials disposed on them. For example and referring to FIG. 3, the prepreg 300 may comprise a protective covering 330 disposed on a surface of a first ply 310. The ply 310 is coupled to another ply 320. The protective covering 330 may take the form of a film, coating, a layer, a laminate or other suitable coverings that can act to protect the layers underneath the covering 330. In some embodiments, the covering may be designed to filter out wavelengths outside of a certain frequency while permitting desirable wavelengths to pass through the structure to an underlying antenna or electronic device. For example, the covering 330 may be configured as a low pass filter, a high pass filter or both to provide a transmission window permitting frequencies within the window to be transmitted through the prepreg 300. While a single covering 330 is shown, two or more coverings, layers or the like may be present. In addition, if desired, a covering may be disposed on the ply 320 such that coverings sandwich the plies within the prepreg 300. In some instances, the covering 330 may be selected for aesthetic purposes, e.g., may be camouflaged or selectively colored, but does not have any protective or functional properties. In some embodiments, the covering 330 may comprise a different material than present in the prepregs. For example, the covering may comprise ultra-high molecular weight polyethylene (UHMWPE) or fiber-reinforced UHMWPE. In other instances, the covering 330 may comprise polyetheretherketone (PEEK) or fiber-reinforced PEEK. Additional suitable covering materials different from those present in the substrates of the prepregs will be selected by the person of ordinary skill in the art, given the benefit of this disclosure.

In certain embodiments, many different substrates can be used to prepare the prepregs described herein. In some embodiments, the substrate is generally transparent to radio waves or microwaves (or another desired radiation frequency) when present in the prepreg or cured article. For example, the substrate may pass radio signals or microwave signals sent from a transmitter within the structure formed by the substrate. In addition, the substrate may permit a receiver within the structure formed by the substrate to receive radio signals or microwave signals reflected from an object or sent from a transmitter of another device or system.

The cured articles are generally thin walled but structurally robust to withstand the various forces encountered by articles.

In certain examples, the substrates of the articles described herein may be porous substrates that can be impregnated with a resin produced as described herein. The substrates may be, or may comprise, a woven fabric, a non-woven fabric, a ceramic, a plastic, a glass, a polymer, or may take other forms. In some instances, the substrate may comprise fiberglass, nylon, polyester, a polyethersulfone, an aramid (such as KEVLAR® or NOMEX® available from Dupont), a polyethylene, a polypropylene, a polyolefin, a polyimide, a polyamide, a polyamide-imide, a polyphenylene sulfide, carbon, carbon black, graphite, diamond, a polybenzimidazole (PBI), a polybenzoxazole (PBO), a halocarbon or other suitable materials. In some instances, the substrate may comprise one or more forms of glass. For example, the substrate may be produced from E-glass (alumino-borosilicate glass with less than about 1 weight percent alkali oxides), A-glass (alkali-lime glass with substantially no boron oxide), E-CR-glass (alumino-lime silicate with less than 1% by weight alkali oxides), C-glass (alkali-lime glass with high boron oxide content), D-glass (borosilicate glass with a low dielectric constant), L-glass (ultra-low dispersion glass commonly used in optics), R-glass (alumino silicate glass without any substantial amounts of MgO and CaO), and S-glass (alumino silicate glass without CaO but with high MgO content).

In some instances, the substrate may be fiber free or may be fiber-reinforced to provide additional strength. Where fibers are present, the fibers may be thermoplastic fibers, thermoset fibers, glass fibers, ceramic fibers, metal fibers or other suitable types of fibers. For example, one or more glass fibers selected from E-glass fibers, A-glass fibers, E-CR-glass fibers, C-glass fibers, D-glass fibers, R-glass fibers and S-glass fibers can be used in the substrate. The substrate may include a first material, e.g., a fabric, and a second different material, e.g., glass fibers, if desired. The different materials may be present as separate plies of a multi-ply prepreg or may be present in regions or zones or the same ply. In some embodiments, the fibers may be added directly to the resins described herein, e.g., a resin of formulae (I)-(III), prior to addition of the resin to the substrate. In other instances, two or more different types of fibers are present in the substrate or the final article.

In certain embodiments, the substrates described herein and/or the resins described herein may comprise one or more additives. For example, the substrate may comprise crystals, quartz, glass particles, stabilizing agents, flame retardants (halogenated flame retardants, phosphorated flame retardants, etc.), smoke suppressants, or other materials to impart one or more desired physical properties to the cured article comprising the substrate. In certain examples, one or more metal catalysts may be added to the resins. For example, a metal catalyst, e.g., a transition metal catalyst such as chromium acetylacetonate, may be added to the resin. In some instances, one or more hardeners or curing agents may be included in the substrate or resin or both to increase (or decrease) the rate at which the prepregs cure to form the final article. When cured, the prepregs generally form a hard article that is inflexible. Such hard structures are desirably suitable for protecting underlying electronic devices from damage from weather or unwanted physical contact. In other instances, however, the cured articles may be flexible, at least to some degree, after curing or may include flexible sections after curing. The flexible articles can be bent to at least some degree into a desired shape and may be held in the desired shape using suitable fasteners, e.g., bolts, screws, adhesives, rivets or other suitable fasteners.

In some embodiments, the articles described herein may comprise one or more additional layers coupled to the prepreg layers. For example, a porous, foam or honeycomb structure may be present between prepreg layers comprising the resins described herein to increase the overall thickness of the cured article without imparting too much weight. Alternatively, the foam may be present on an inner surface, e.g., near an antenna or other electronic device, to increase the overall thickness of the articles. Where such foams or other layers are present, the materials selected for the other layers desirably do not alter the physical properties of the final article, e.g., the final article still comprises one or more of (1) a dielectric constant at 10 GHz (as measured by ASTM 2520) of less than or equal to 2.7, more particularly a dielectric constant of less than or equal to 2.6, 2.5 or even 2.4, (2) a loss tangent (as measured by ASTM 2520) of less than or equal 0.003, more particularly, less than or equal to 0.00275, 0.0025 or even less than or equal to 0.00225, and (3) water absorption (as measured by ASTM D570-98) of less than or equal to 1.5%, more particularly, less than or equal to 1.4%, 1.3%, 1.25%, 1.1%, 1% or even less than or equal to 0.75%.

In some examples, the prepregs described herein may be cured using many different suitable methods. For example, the prepregs may be subjected to heat to polymerize the resin and harden the prepreg. The exact curing temperature used will depend on the particular resin blend selected, but illustrative curing temperatures include, but are not limited to 80° C. to about 100° C. or about 150° C. to about 200° C. In some embodiments, the monomer and oligomer selected for use in the resin may provide a bi-curable resin that is cured in two or more different temperature steps. Without wishing to be bound by any particular scientific theory, the polymerization products which result from bi-curing, e.g., curing at two different temperatures, may not be the same as the products which result from curing at a single temperature for the cure period. In some instances, the resin materials may be combined with a catalyst and first cured at a temperature of about 70° C. to about 110° C. for a first period. The resin may then be cured for a second period at a higher temperature, e.g., about 150-200° C. for a second period. If desired, a third curing temperature higher than the first and second may also be used. Once polymerization ceases or terminates, the resin desirably provides a dielectric constant of less than 2.7, a loss tangent of less than 0.003 and a moisture absorption of less than 1.5%. In some instances, it may be desirable to include a rate limiting compound with the resin to limit the degree of polymerization during the first curing temperature. For example, phosphines such as triphenylphosphine or other suitable rate limiters may be added to ensure that polymerization is not complete during the first curing temperature. In other instances, the bi-curing temperatures can be selected to provide a resin (or prepreg or final, cured article) whose glass transition temperature is greater than a comparable resin produced using a single curing step.

Figure 4:
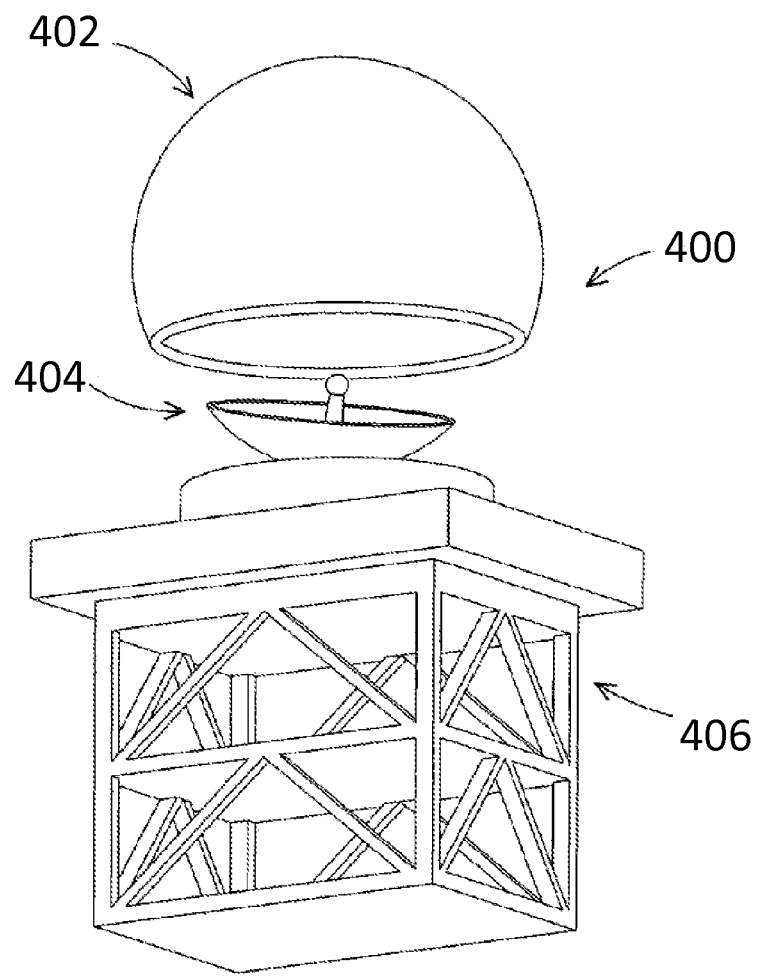
FIG. 4 is an illustration of a radome comprising an antenna.

In certain examples, the prepregs described herein may be cured using suitable devices such as molding apparatus, vacuum bag devices or using other suitable methods and devices. If desired, the curing may be performed in a substantially inert environment devoid of oxygen or other gases or an inert gas, e.g., nitrogen, may be introduced into the curing apparatus if desired. In some instances, curing may simultaneously be accompanied by forming of the prepreg into a desired shape for use in an article such as, for example, a radome. For example, where the prepregs are used to form a radome, the prepregs can be formed into pieces which can be coupled to each other to form a dome or truncated sphere. Each individual piece can be molded or formed into a desired size and thickness and then coupled to other pieces to provide the radome structure. Referring to FIG. 4, a system 400 comprises a radome 402 constructed and arranged to protect an antenna 404. The antenna 404 is mounted on a support structure 406 which may include a power source and electronics (not shown) such as a controller or processor, if desired, or may be electrically coupled to a controller or processor positioned below the structure 406. In use of the system 400, the antenna 404 is covered by the radome 402 which is also supported on support structure 406. The antenna 404 could alternately be located on a building, could be ground-based, could be coupled to an aircraft, recreational vehicle, train, bus, subway, automotive vehicle or other devices which may themselves be mobile. The radome 402 comprises a suitable structure formed using one or more of the resins described herein to protect the antenna 404 from environmental elements without causing significant interference to the signals to be transmitted and received by the antenna 404. For example, the radome 402 may be produced using one or more prepregs or plies comprising one or more of the resins described herein to provide a final radome structure that has a dielectric constant at 10 GHz (as measured by ASTM 2520) of less than or equal to 2.7, more particularly a dielectric constant of less than or equal to 2.6, 2.5 or even 2.4. In some instances, the radome 402 may also have a loss tangent (as measured by ASTM 2520) of less than or equal 0.003, more particularly, less than or equal to 0.00275, 0.0025 or even less than or equal to 0.00225. In further configurations, the radome 402 may also have a water absorption (as measured by ASTM D570-98) of less than or equal to 1.5%, more particularly, less than or equal to 1.4%, 1.3%, 1.25%, 1.1%, 1% or even less than or equal to 0.75%. In some embodiments, the radome 402 is produced by coupling a plurality of plies to each other, where least one of the plurality of plies comprises a substrate and a resin as described herein.

In certain embodiments, while an antenna within a dish is shown under the radome 402 in FIG. 4, the antenna may be part of a larger system or other electronic devices may instead be present under radomes. For example, the antenna 404 may be a high frequency radar antenna. In other instances, the antenna 404 may be a phased array or a dish (such as a parabolic dish, a split cylinder dish) and may be rotating or non-rotating. In some instances, the antenna 404 and radomes 402 may be part of a number of different types of radar system assemblies. For example, radome 402 can be used in conjunction with weather radar systems, and airport radar systems. In certain examples, instead of using a radar antenna, the system 400 could include other antennas 404, one such antenna being a satellite communication antenna. In other instances, the radome 404 may be used as part of a cellular communication system to protect underlying antennas from weather. In some embodiments, the radome may be part of a wireless communication device, e.g., an outside Wi-Fi or Bluetooth system, that can provide communication between devices. For example, the radome and Wi-Fi device may be part of a mobile communication system that permits users to access broadband communications devices through mobile devices such as cellular phones, laptops, tablets, etc. The Wi-Fi device/radome system may be mounted on a mobile vehicle or a non-mobile structure, e.g., a telephone pole, wall of a building, etc. In some embodiments, the communications system may comprise a first system configured to operate as a radar system and a second system configured to provide wireless access. For example, a single radome of an aircraft or ship may house a radar system and a Wi-Fi system to permit user's on the aircraft or ship to have wireless communication through the mobile devices and the Wi-Fi system.

In some examples, the radomes may be present on a vehicle such as an automotive vehicle, truck, bus, train, subway, plane, a ship, a submarine or the like. For example, the radome may be integrated into (or attached to) a front or rear bumper (or both) of a vehicle and protect an underlying antenna that may transmit and receive waves for proximity detection. In other instances, the radome may be part of the vehicle to send and receive communications from and to the vehicle, e.g., may be part of a cellular communication network or wireless communication system such as those found on ships, planes and trains. Where the radome is part of a ship, plane or train, it may take an aerodynamic shape to not increase drag to a substantial degree. Where the radome is present in underwater applications, e.g., on a submarine for protecting a sonar system or in an underwater communication system, the radome may be sealed to a permanent structure so a fluid tight seal is present between the radome and the structure to protect any underlying antenna or other communications devices. Where the communication devices are deployed, e.g., from a submerged vessel to a surface, the radome may be buoyant to permit it to float on the surface without the need for an external bladder or other flotation device. The low moisture absorption of the radomes described herein permit use of the radomes in salt water and other moist environments without any substantial interference of the transmission to and from electronic devices within the radome.

In certain embodiments, the radomes described herein may be integral to an electronic device to protect the electronic device while at the same time permitting the electronic device to receive and/or send signals. For example, a cellular phone may comprise an integral radome with an embedded microantenna. If desired, the microantenna can be configured to rotate or move to increase the overall signal receiving capabilities of the phone. A touch screen can be electrically or wirelessly coupled to the cellular phone to permit the user to access the phones features. In some embodiments, the radome may be integral to a structural component of a vehicle, e.g., a bumper, emergency lights, nose cone or other components of vehicles such that the radome takes the general shape of the structural part of the vehicle.

In some embodiments, the radomes described herein may be used for military operations communications or emergency operations communications. For example, military personnel, police vehicles, emergency centers and the like may wish to use dedicated radio bands outside normal over the air scanning frequencies to communicate with each other. A conventional handheld scanner may scan frequencies from about 29 MHz to about 1.3 GHz. These frequencies are generally referred to as very high frequencies (VHF) for frequencies from 30 MHz to about 330 MHz or ultra-high frequencies (UHF) for frequencies from about 330 MHz to about 2.9 GHz. While the radomes described herein can be used in VHF and UHF bands, emergency operation communications transmitted at these frequencies may be received and heard by anyone with a hand held scanner. To avoid reception by the public, the radomes described herein can be used in combination with a transmitter/receiver to transmit or receive signals in the S band (2-4 GHz), C band (4-8 GHz), X band (8-12 GHz), $K_u$ band (12-18 GHz), K band (18-26.5 GHz), $K_a$ band (26.5-40 GHz), Q band (30-50 GHz), U band (40-60 GHz), V band (50-75 GHz), E band (60-90 GHz), W band (75-110 GHz), F band (90-140 GHz) or D band (110-170 GHz). In particular, bands such as the $K_a$ band and Q band can be used in satellite communications. For example, a satellite may include a radome and underlying transmitter/receiver configured to transmit/receive signals in the 20-50 GHz range. In addition, frequencies of 20-50 GHz may be used in nose cone radar systems (or radar systems positioned other than in the nose) of aircraft for close-range targeting of targets. If desired, the geometry of the radome on aircraft may be constructed to provide stealth like capability, e.g., the radome does not comprise a shape at any portion that would readily reflect radar waves and permit detection of the aircraft by enemy personnel. The satellites may take the form of communication satellites, e.g., those with geostationary orbits, elliptical orbits or other orbits, or other types of satellites or similar devices, e.g., weather satellites, military satellites, astronomical satellites, navigational satellites, reconnaissance satellites, earth observation satellites, on space stations or other devices that orbit the earth. In other instances, the resins and articles described herein can be used to cover sonar systems, e.g., those used by the Navy that typically are designed to detect low frequencies in the 100-500 Hz or 1 kHz-10 kHz range. The sonar systems may be fixed, e.g., positioned on the ocean floor, or may be part of a vessel such as a ship or submarine.

Figure 5:
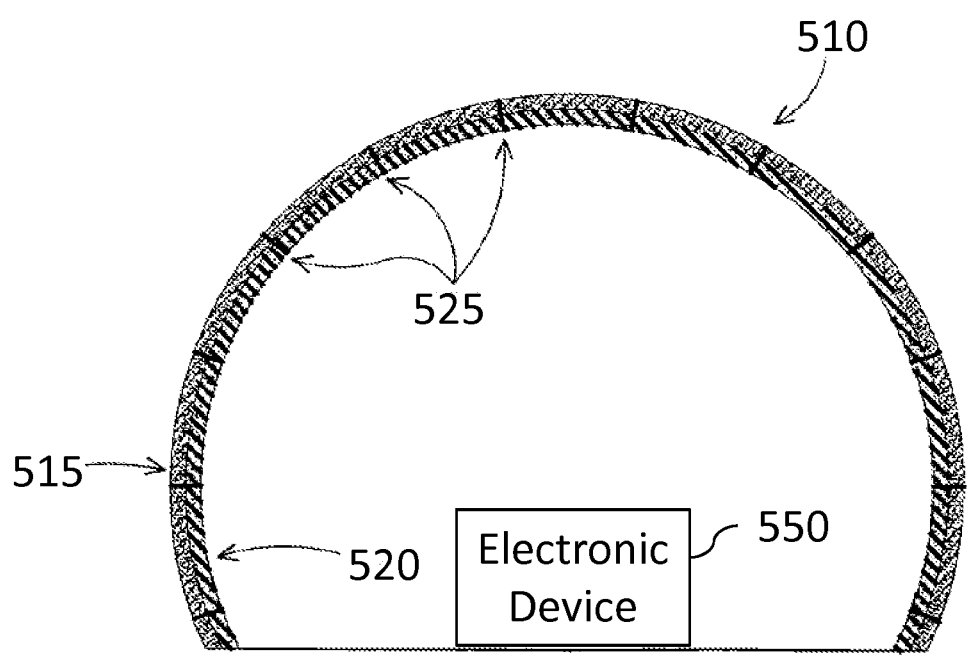
FIG. 5 is an illustration of a radome covering an electronic device.

In certain examples and referring to FIG. 5, a side view of a radome 510 covering an electronic device 550 is shown. The radome 510 comprises a plurality of plies 515 as described herein. The radome may comprise an inner insulation layer 520, if desired, to insulate the electronic device 550 from the elements or to prevent thermal loss from inside the radome where an air conditioner (not shown) provides cooled air to any electronic devices within the radome 510. The radome 510 may also comprise structural support elements 525 integrally connecting sections of the radome 510. While the exact thickness of the radome 510 may vary depending on the intended use of the radome 510, in some instances, the thickness is about 0.01 inches thick to about 0.5 inches thick, more particularly about 0.01 inches to about 0.2 inches, for example, about 0.07 inches to about 0.15 inches. The electronic device 550 may take many forms as described herein and may include an antenna or transmitter/receiver that can send and receive signals. In some embodiments, the electronic device 550 may be part of a radar system, a sonar system, a communications system, e.g., Wi-Fi systems, Bluetooth systems, radio systems, cellular communication systems, satellite systems or other suitable systems.

In some embodiments, the prepregs and resins described herein may be used to construct thin-plate radomes. While the exact configuration may vary, a thin plate radome is thin in comparison with the wavelength at the operating frequency. In other instances, the radome may be constructed as a half-wavelength radome, where the radome has a thickness equivalent of about one-half the wavelength. Other variations such as quarter-wavelength radomes and the like may also be produced using the materials and prepregs described herein.

The following paragraphs numerically numbered from 1 through 95 provide for various embodiments described herein.

1. A radome comprising a plurality of plies coupled to each other, in which at least one of the plurality of plies comprises a substrate and a cured resin blend produced from an effective amount of a cyanate monomer and an effective amount of a cyanate ester oligomer to provide a dielectric constant of less than 2.7, a glass transition temperature of at least 150° C., in particular at least 175° C. and a moisture absorption of less than 1.5% for the radome.

2. The radome of paragraph 1, in which the monomer is a compound of formula (I)

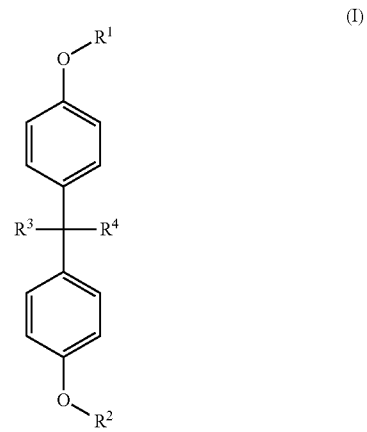

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl, and wherein $R^3$ and $R^4$ are independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

3. The radome of paragraph 1, in which the monomer is a compound of formula (II)

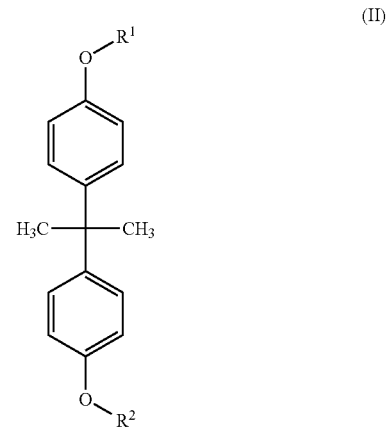

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

4. The radome of paragraph 1, in which the monomer is a compound of formula (III)

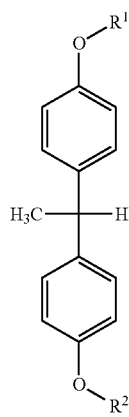

(III)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

5. The radome of paragraph 1, in which the monomer is a compound of formula (IV)

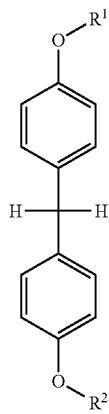

(IV)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

6. The radome of paragraph 1, in which the monomer is a compound of formula (V)

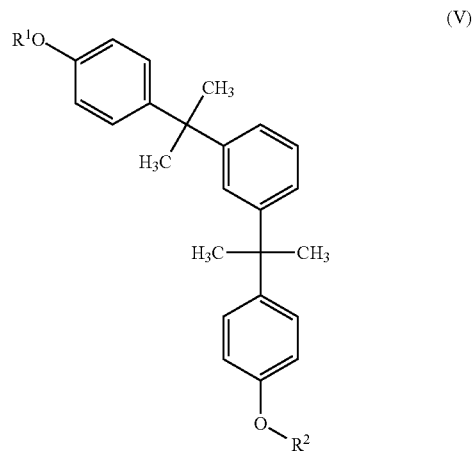

(V)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

7. The radome of paragraph 1, in which the monomer is a compound of formula (VI)

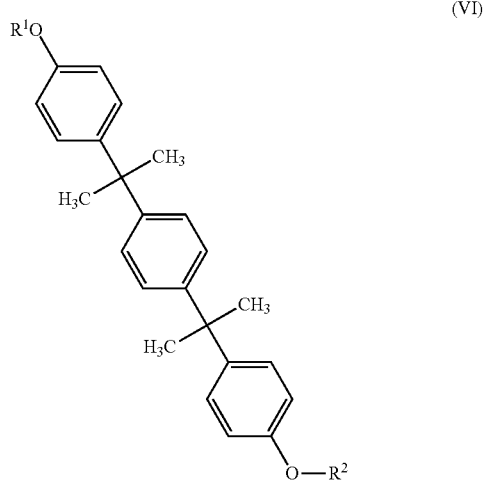

(VI)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

8. The radome of paragraph 1, in which the monomer is a compound of formula (VII)

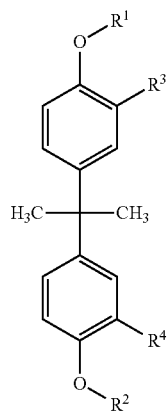

(VII)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl, and wherein $R^3$ and $R^4$ are independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

9. The radome of paragraph 1, in which the monomer is a compound of formula (VIII)

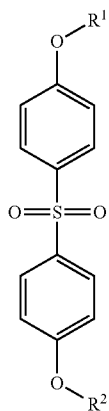

(VIII)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

10. The radome of paragraph 1, in which the monomer is a compound of formula (IX)

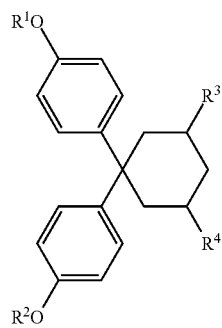

(IX)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl, wherein $R^3$ and $R^4$ are each independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

11. The radome of any of paragraphs 1-10, in which the oligomer is a cyanate ester oligomer comprising two or more monomeric units each selected from a compound having the formula (I)-(IX).

12. The radome of paragraph 1, in which the cyanate monomer comprises a bisphenol dicyanate group and the cyanate ester oligomer comprises a diphenylcyanate group.

13. The radome of paragraph 1, in which the monomer is present from about 30-70 weight percent.

14. The radome of paragraph 13, in which the oligomer is present from about 70-30 weight percent.

15. The radome of paragraph 1, further comprising at least one phenol added to the resin blend.

16. The radome of paragraph 15, further comprising at least one metal catalyst added to the resin.

17. The radome of paragraph 1, in which the substrate comprises one or more of a woven fabric, a non-woven fabric, a ceramic, a plastic, a glass, a fiberglass, a nylon, a polyester, a polyethersulfone, an aramid, a polyethylene, a polypropylene, a polyolefin, a polyimide, a polyamide, a polyamide-imide, a polyphenylene sulfide, a carbon, a carbon black, a graphite, a diamond, a polybenzimidazole, a polybenzoxazole or a halocarbon.

18. The radome of paragraph 1, in which the effective amount of the monomer by weight exceeds the effective amount of the oligomer by weight.

19. The radome of paragraph 1, in which the radome further comprises a loss tangent of less than 0.004.

20. The radome of paragraph 1, further comprising an insulation material disposed on the inner surface of the radome.

21. A prepreg comprising a plurality of plies coupled to each other, in which at least one of the plurality of plies comprises a substrate and a resin blend comprising an effective amount of a cyanate monomer and an effective amount of a cyanate ester oligomer to provide a cured resin comprising a dielectric constant of less than 2.7, a glass transition temperature of at least 150° C., in particular at least 175° C. and a moisture absorption of less than 1.5%.

22. The prepreg of paragraph 21, in which the monomer is a compound of formula (I)

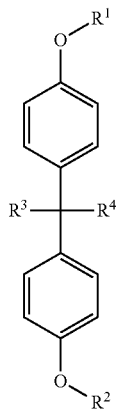

(I)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

23. The prepreg of paragraph 21, in which the monomer is a compound of formula (II)

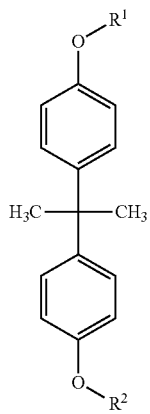

(II)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

24. The prepreg of paragraph 21, in which the monomer is a compound of formula (III)

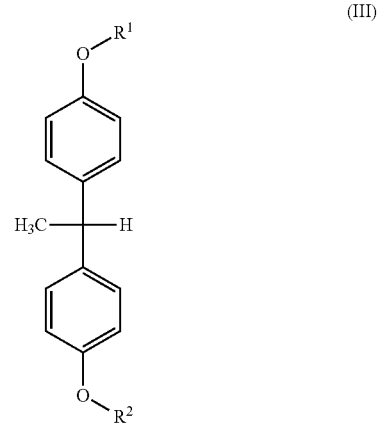

(III)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

25. The prepreg of paragraph 21, in which the monomer is a compound of formula (IV)

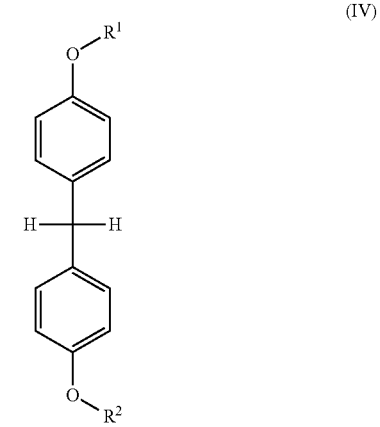

(IV)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

26. The prepreg of paragraph 21, in which the monomer is a compound of formula (V)

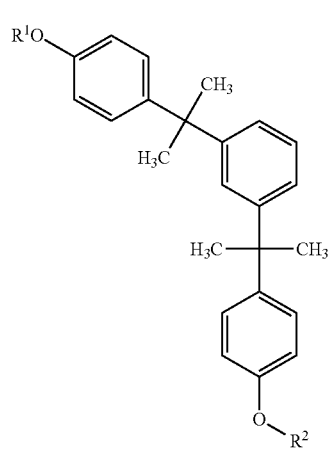

(V)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

27. The prepreg of paragraph 21, in which the monomer is a compound of formula (VI)

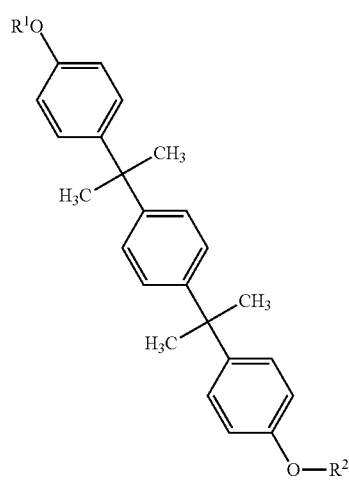

(VI)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

28. The prepreg of paragraph 21, in which the monomer is a compound of formula (VII)

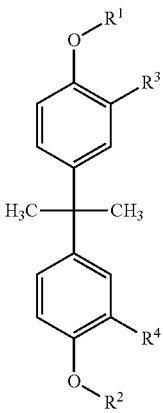

(VII)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl, and wherein R3 and R4 are independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

29. The prepreg of paragraph 21, in which the monomer is a compound of formula (VIII)

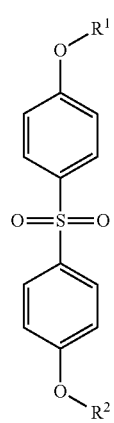

(VIII)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

30. The prepreg of paragraph 21, in which the monomer is a compound of formula (IX)

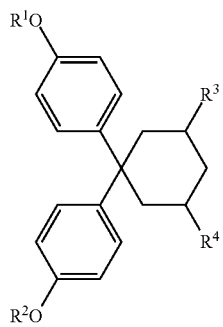

(IX)

wherein at least one of R¹ and R² is —CN and the other of R¹ and R² is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl, wherein R³ and R⁴ are each independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

31. The prepreg of any of paragraphs 21-30, in which the oligomer is a cyanate ester oligomer comprising two or more monomeric units each selected from a compound having the formula (I)-(IX).

32. The prepreg of paragraph 21, in which the cyanate monomer comprises a bisphenol dicyanate group and the cyanate ester oligomer comprises a diphenylcyanate group.

33. The prepreg of paragraph 21, in which the monomer is present from about 30-70 weight percent.

34. The prepreg of paragraph 33, in which the oligomer is present from about 70-30 weight percent.

35. The prepreg of paragraph 21, further comprising at least one phenol added to the resin blend.

36. The prepreg of paragraph 35, further comprising at least one metal catalyst added to the resin blend.

37. The prepreg of paragraph 21, in which the substrate comprises one or more of a woven fabric, a non-woven fabric, a ceramic, a plastic, a glass, a fiberglass, a nylon, a polyester, a polyethersulfone, an aramid, a polyethylene, a polypropylene, a polyolefin, a polyimide, a polyamide, a polyamide-imide, a polyphenylene sulfide, a carbon, a carbon black, a graphite, a diamond, a polybenzimidazole, a polybenzoxazole or a halocarbon.

38. The prepreg of paragraph 21, in which the effective amount of the monomer by weight exceeds the effective amount of the oligomer by weight.

39. The prepreg of paragraph 21, in which the prepreg further comprises a loss tangent of less than 0.004.

40. The prepreg of paragraph 21, further comprising a covering coupled to at least one of the plies of the prepreg.

41. A resin blend comprising an effective amount of a cyanate ester monomer and an effective amount of a cyanate ester oligomer to provide a cured resin comprising a dielectric constant of less than 2.7, a loss tangent of less than 0.004, a glass transition temperature of at least 150° C., in particular at least 175° C. and a moisture absorption of less than 1.5%.

42. The resin of paragraph 41, in which the monomer is a compound of formula (I)

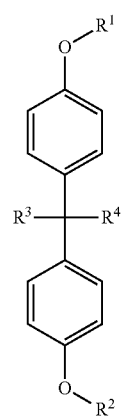

(I)

wherein at least one of R¹ and R² is —CN and the other of R¹ and R² is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

43. The resin of paragraph 41, in which the monomer is a compound of formula (II)

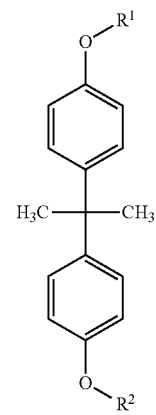

(II)

wherein at least one of R¹ and R² is —CN and the other of R¹ and R² is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

44. The resin of paragraph 41, in which the monomer is a compound of formula (III)

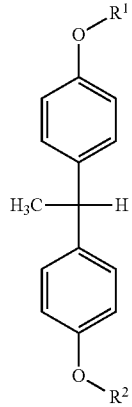

(III)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

45. The resin of paragraph 41, in which the monomer is a compound of formula (IV)

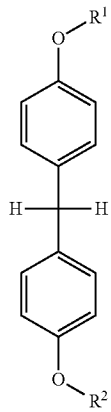

(IV)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

46. The resin of paragraph 41, in which the monomer is a compound of formula (V)

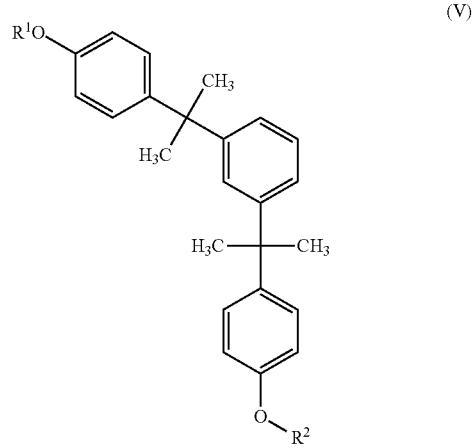

(V)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

47. The resin of paragraph 41, in which the monomer is a compound of formula (VI)

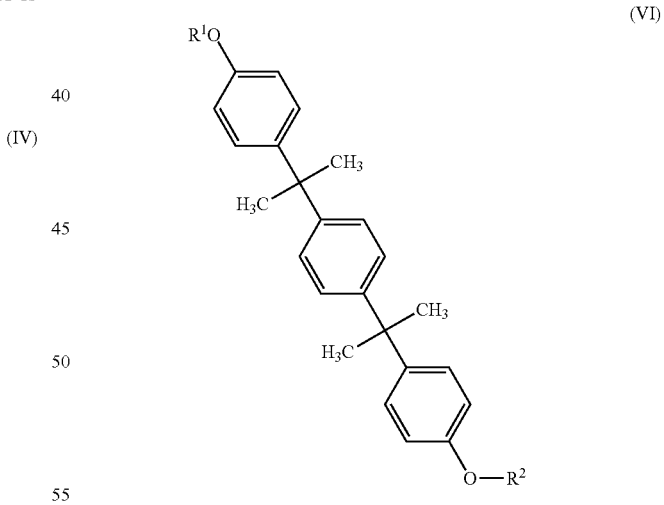

(VI)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

48. The resin of paragraph 41, in which the monomer is a compound of formula (VII)

(VII)

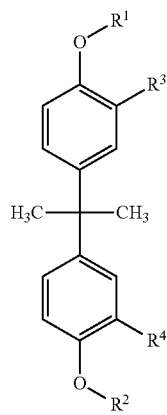

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl, and wherein R3 and R4 are independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

49. The resin of paragraph 41, in which the monomer is a compound of formula (VIII)

(VIII)

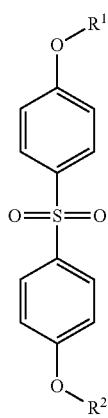

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

50. The resin of paragraph 41, in which the monomer is a compound of formula (IX)

(IX)

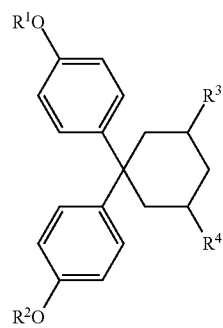

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl, wherein $R^3$ and $R^4$ are each independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

51. A resin blend comprising an effective amount of at least two cyanate monomers and an effective amount of a cyanate ester oligomer to provide a cured resin comprising a dielectric constant of less than 2.7, a loss tangent of less than 0.004, a glass transition temperature of at least 150° C., in particular at least 175° C. and a moisture absorption of less than 1.5%.

52. The resin of paragraph 51, in which at least one of the monomers is a compound of formula (I)

(I)

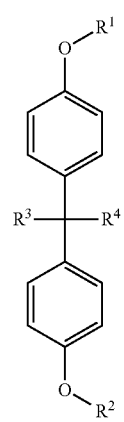

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

53. The resin of paragraph 51, in which at least one monomer is a compound of formula (II)

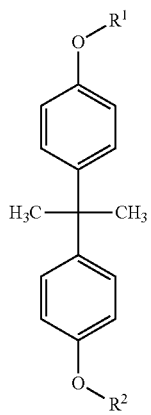

(II)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

54. The resin of paragraph 51, in which at least one monomer is a compound of formula (III)

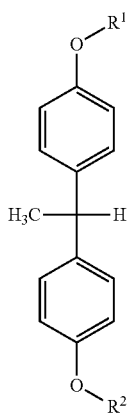

(III)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

55. The resin of paragraph 51, in which at least one monomer is a compound of formula (IV)

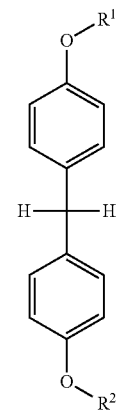

(IV)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

56. The resin of paragraph 51, in which at least one monomer is a compound of formula (V)

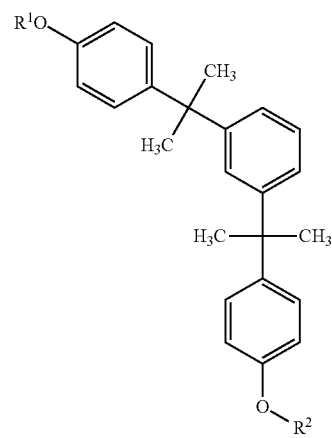

(V)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

57. The resin of paragraph 51, in which at least one monomer is a compound of formula (VI)

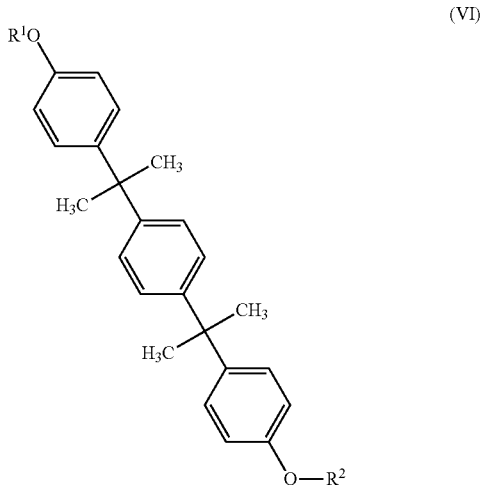

(VI)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

58. The resin of paragraph 51, in which at least one monomer is a compound of formula (VII)

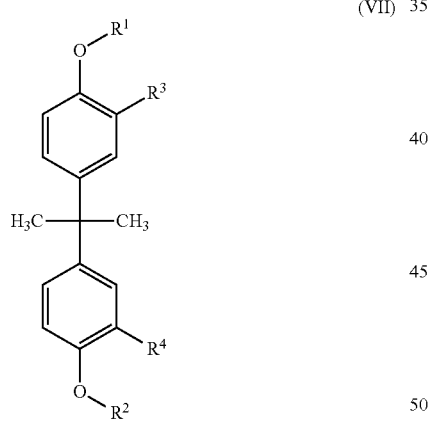

(VII)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl, and wherein R3 and R4 are independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

59. The resin of paragraph 51, in which at least one monomer is a compound of formula (VIII)

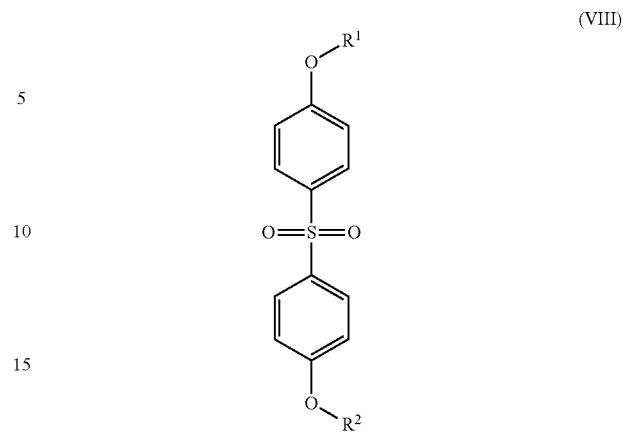

(VIII)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

60. The resin of paragraph 51, in which at least one monomer is a compound of formula (IX)

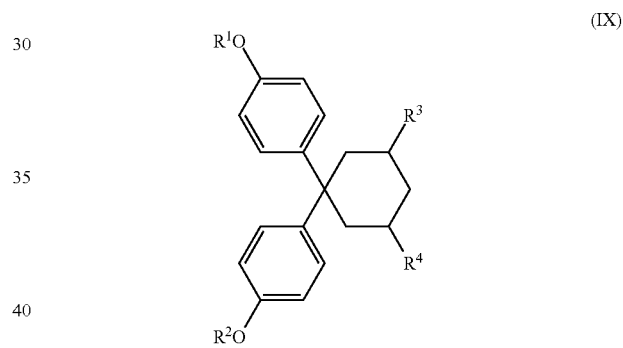

(IX)

wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl, and wherein $R^3$ and $R^4$ are each independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl.

61. A system comprising:
the radome of any of paragraphs 1-20; and
an electronic device covered by the radome.

62. The system of paragraph 61, in which the electronic device comprises an antenna.

63. The system of paragraph 61, in which the radome is sized and arranged to be placed on an aircraft.

64. The system of paragraph 61, in which the radome is sized and arranged to be placed on a ship.

65. The system of paragraph 61, in which the radome is sized and arranged to be placed on a hull of a ship, in which the radome is immersed in the water during operation of the ship.

66. The system of paragraph 61, in which the electronic device is part of a radar system.

67. The system of paragraph 61, in which the electronic device is part of a sonar system.

68. The system of paragraph 61, in which the electronic device is part of a communication system.

69. The system of paragraph 68, in which the communication system is selected from the group consisting of Wi-Fi systems, Bluetooth systems, radio systems, cellular communication systems and satellite systems.

70. A satellite comprising a transmitter/receiver and the radome of any of paragraphs 1-20 sized and arranged to protect the transmitter/receiver.

71. An automotive vehicle comprising a transmitter/receiver configured to couple to a bumper of the vehicle, the vehicle further comprises the radome of any of paragraphs 1-20 sized and arranged to protect the coupled transmitter/receiver.

72. An aircraft comprising a radar system and the radome of any of paragraphs 1-20 configured to cover and protect the radar system.

73. The aircraft of paragraph 72, in which the radar system is positioned in a nose cone or an undersurface of the aircraft.

74. A ship comprising a radar system and the radome of any of paragraphs 1-20 configured to cover and protect the radar system.

75. The ship of paragraph 74, in which the radar system is positioned external to the hull of the ship and beneath the water surface in operation of the ship.

76. A submarine comprising a sonar system and the radome of any of paragraphs 1-20 configured to cover and protect the sonar system.

77. The submarine of paragraph 76, in which the sonar system is positioned external to the hull of the submarine.

78. A method of producing a radome comprising:
disposing the resin blend of any of paragraphs 41-60 on a substrate; and
polymerizing the disposed resin to provide a radome comprising a dielectric constant of less than 2.7, a glass transition temperature of at least 150° C., in particular at least 175° C. and a moisture absorption of less than 1.5%.

79. The method of paragraph 78, in which polymerizing the disposed resin also provided a radome with a loss tangent of less than 0.004.

80. The method of paragraph 78, further comprising adding at least one additive to the resin before or after polymerization of the resin.

81. The method of paragraph 80, in which the additive is a flame retardant, a smoke suppressant or a pigment.

82. The radome of any of paragraphs 1-20, further comprising one or more of a flame retardant, a filler and a curing agent.

83. The prepreg of any of paragraphs 21-40, further comprising one or more of a flame retardant, a filler and a curing agent.

84. The resin of any of paragraphs 41-60, further comprising one or more of a flame retardant, a filler and a curing agent.

85. The radome of 1, in which the monomer is a dicyclopentadienyl bisphenol cyanate ester.

86. The prepreg of paragraph 21, in which the monomer is a dicyclopentadienyl bisphenol cyanate ester.

87. The resin of paragraph 41 or paragraph 51, in which the monomer is a dicyclopentadienyl bisphenol cyanate ester.

88. The radome of paragraph 1 or the prepreg of paragraph 21, in which the oligomer comprises a dicyclopentadienyl bisphenol cyanate ester monomeric unit.

89. The resin of paragraph 41 or paragraph 51, in which the oligomer comprises a dicyclopentadienyl bisphenol cyanate ester monomeric unit.

90. A radome comprising a plurality of plies coupled to each other, in which at least one of the plurality of plies comprises a substrate and a cured resin produced from an effective amount of a cyanate monomer selected from monomers of formula (I)-(IX) and dicyclopentadienyl bisphenol cyanate ester monomers to provide a dielectric constant of less than 2.7, a glass transition temperature of at least 150° C. and a moisture absorption of less than 1.5% for the radome.

91. A prepreg comprising a plurality of plies coupled to each other, in which at least one of the plurality of plies comprises a substrate and a resin comprising an effective amount of a cyanate monomer selected from monomers of formula (I)-(IX) and dicyclopentadienyl bisphenol cyanate ester monomers to provide a cured resin comprising a dielectric constant of less than 2.7, a glass transition temperature of at least 150° C. and a moisture absorption of less than 1.5%.

92. A resin comprising an effective amount of a cyanate ester monomer selected from monomers of formula (I)-(IX) and dicyclopentadienyl bisphenol cyanate ester monomers to provide a cured resin comprising a dielectric constant of less than 2.7, a loss tangent of less than 0.004, a glass transition temperature of at least 150° C. and a moisture absorption of less than 1.5%.

93. The radome of paragraph 90 or the prepreg of paragraph 91 or the resin of paragraph 92, further comprising at least one phenol added to the resin.

94. The radome of paragraph 90 or the prepreg of paragraph 91 or the resin of paragraph 92, further comprising at least one metal catalyst added to the resin.

95. The radome of paragraph 90 or the prepreg of paragraph 91, in which the substrate comprises one or more of a woven fabric, a non-woven fabric, a ceramic, a plastic, a glass, a fiberglass, a nylon, a polyester, a polyethersulfone, an aramid, a polyethylene, a polypropylene, a polyolefin, a polyimide, a polyamide, a polyamide-imide, a polyphenylene sulfide, a carbon, a carbon black, a graphite, a diamond, a polybenzimidazole, a polybenzoxazole or a halocarbon.

Certain specific examples were described below to illustrate some of the novel aspects and features of the technology described herein.

Materials Used in the Examples

Cyanate ester materials that were used were obtained commercially from Huntsman and Lonza; 2,2-bis(4-cyanatophenyl)propane (commercial name: Arocy B 10 from Huntsman), 4,4'-(1,3-phenylenediisopropylidene)diphenylcyanate (commercial name: Arocy XU 366 from Huntsman), oligomer of 4,4'-(1,3-phenylenediisopropylidene)diphenylcyanate (commercial name: Arocy XU 378 from Huntsman); ethylidene bis-4,1-phenylene dicyanate (commercial name: Arocy L-10 from Huntsman); Arocy XU 371 (commercial name from Huntsman); polyphenolcyanates (Primaset BA-3000; Primaset DT-4000; Primaset DT-7000 commercial names from Lonza). Nonylphenol and chromium acetylacetonate were purchased from Sigma-Aldrich. Thermoplastics, such as noryl SA9000 and noryl SA120, are purchased from Sabic and fatty acid amides as a slip agent, such as Crodamide ER, was purchased from Crodamide. Quartz 4581 fabric was purchased from JPS.

Examples 1-5

Examples 1-5 in Table 1 show various resin blend formulations that were produced using AroCy XU-378 (oligomer) and AroCy B-10 (monomer). To prepare the blends, a mixture of Arocy XU-366 and Arocy B-10 (total weight: 50 g) were placed in a 4 ounce glass jar, and the mixture was stirred at 100° C. for 30 min. Next, a solution of chromium acetylacetonate (75 mg; 0.15%) dissolved in nonylphenol (3.0 g; 6%) was added to the mixture, and then the mixture was stirred at the same temperature for 3 minutes. The resin blend was poured into a preheated disc shaped mold (2.5 inch diameter by ⅛ inch thickness) and then placed in a vacuum oven which was degased for 30 min at 100° C. under vacuum. Then, the blend was cured at 177° C. for 2 hours followed by post-curing at 200° C. for 1 hour. Table 1 shows the formulation, and the physical properties measured for each formulation.

TABLE 1

| | Formulation No. | | | | |
|---|---|---|---|---|---|
| | 1 | 2 | 3 | 4 | 5 |
| Components | | | | | |
| AroCy XU-378 (oligomer) | 100 | 70 | 50 | 30 | 0 |
| AroCy B-10 (monomer) | 0 | 30 | 50 | 70 | 100 |
| Nonylphenol | 6 | 6 | 6 | 6 | 6 |
| Chromium acetylacetonate | 0.15 | 0.15 | 0.15 | 0.15 | 0.15 |
| Properties | | | | | |
| Dielectric Constant (1 MHz) | 2.57 | 2.67 | 2.60 | 2.59 | 2.8 |
| Dielectric Constant (10 GHz) | 2.666 | | 2.765 | 2.805 | |
| Loss Tangent (10 GHz) | 0.00344 | | 0.00529 | 0.00615 | |
| Moisture Absorption (%) | 0.29 | | | 0.55 | |
| $T_g$ (° C.) | 171.5 | 203.5 | 212.7 | 232.9 | 252.1 |

The percentage moisture absorption was measured at 85° C./85% relative humidity after 12 days.

As shown in Table 1, the resin blend formulations (Examples 2-4) exhibited a dielectric constant at 1 MHz of less than 2.7. In particular, where the monomer and the oligomer were each present from 30-70 weight percent, suitable dielectric constants were obtained. Example 1 included only oligomer and no monomer and did not provide a suitable glass transition temperature, e.g., a $T_g$ above 150° C., in particular at least 175° C. Example 5 included no oligomer and a single monomeric cyanate compound (2,2-bis(4-cyanatophenyl)propane) and provided a dielectric constant at 1 MHZ above 2.7. By polymerizing the oligomer of formula 1 and monomeric compound of formula 5, a resin was obtained that did not provide suitable properties for use in radomes. The results were consistent with a resin blend of a monomer and an oligomer providing a dielectric constant at 1 MHZ below 2.7.

The glass transition temperature $T_g$ was also measured for all the examples. The blend formulations (Examples 2-4) provided glass transition temperatures above a threshold value, e.g., above about 150 degrees Celsius.

Examples 6-9

Examples 6-9 show resin blends produced using AroCy XU-378 (oligomer) and AroCy XU-366 (monomer). Experimental procedures were same as described in reference to Examples 1-5. Table 2 shows the formulations and properties.

TABLE 2

| | Formulation No. | | | |
|---|---|---|---|---|
| | 6 | 7 | 8 | 9 |
| Components | | | | |
| AroCy XU-378 (oligomer) | 100 | 70 | 30 | 0 |
| AroCy XU-366 (monomer) | 0 | 30 | 70 | 100 |
| Nonylphenol | 6 | 6 | 6 | 6 |
| Chromium acetylacetonate | 0.15 | 0.15 | 0.15 | 0.15 |
| Properties | | | | |
| Dielectric constant (1 MHz) | 2.57 | 2.56 | 2.57 | 2.44 |

TABLE 2-continued

| | Formulation No. | | | |
|---|---|---|---|---|
| | 6 | 7 | 8 | 9 |
| Dielectric Constant (10 GHz) | 2.666 | 2.666 | | 2.693 |
| Loss Tangent (10 GHz) | 0.00344 | 0.00361 | | 0.00369 |
| Moisture Absorption (%) | 0.29 | 0.32 | | 0.31 |
| $T_g$ (° C.) | 171.5 | 174.2 | 177.0 | 177.4 |

As shown in Table 2, the resin blend formulations (Examples 7 and 8) provided dielectric constants at 1 MHz of less than 2.7. The loss tangent of one of the blends (Example 7) was measured and within an acceptable range, e.g., about 0.004 or below. The glass transition temperature of the blends was within an acceptable range, e.g., about 150-240 degrees Celsius or above a threshold range of about 150° C., in particular at least 175° C.

Laminate: The formulation of Example #9 was applied to a quartz fabric (JPS Quartz 4581 with a resin content of 35 weight percent) to provide a prepreg. A twelve-ply laminate (6 inches by 6 inches) was produced with this prepreg and cured in a vacuum bag using following curing conditions: 177° C. for 2 hours; 200° C. for 1 hour. The dielectric constant (10 GHz) of the laminate was measured to be 2.417, and the loss tangent (10 GHz) was measured to be 0.0014, which is consistent with a laminate being produced that has a dielectric constant less than 2.7, and a loss tangent of less than 0.003. The results were consistent with a monomer comprising two cyanato groups providing a resin with desired properties.

Examples 10-14

Examples 10-14 were produced using AroCy XU-366 (monomer) and AroCy B-10 (monomer). Experimental procedures were the same as described in Examples 1-5. Table 3 shows the formulation and properties.

TABLE 3

| | Formulation No. | | | | |
|---|---|---|---|---|---|
| | 10 | 11 | 12 | 13 | 14 |
| Components | | | | | |
| AroCy XU-366 (monomer) | 100 | 70 | 50 | 30 | 0 |
| AroCy B-10 (monomer) | 0 | 30 | 50 | 70 | 100 |
| Nonylphenol | 6 | 6 | 6 | 6 | 6 |
| Chromium acetylacetonate | 0.15 | 0.15 | 0.15 | 0.15 | 0.15 |
| Properties | | | | | |
| Dielectric Constant (1 MHz) | 2.44 | 2.59 | 2.57 | 2.78 | 2.8 |
| Dielectric Constant (10 GHz) | 2.693 | 2.735 | 2.715 | | |
| Loss Tangent (10 GHz) | 0.00359 | 0.00435 | 0.00661 | | |
| Moisture Absorption (%) | 0.31 | 0.56 | | | |
| $T_g$ (° C.) | 177.4 | 201.4 | 212.0 | 238.7 | 252.1 |

Two of the monomer blend formulations (Examples 11 and 12) using 50% or less of the monomer AroCy B-10 provided dielectric constants at 1 MHz of less than 2.7. The glass transition temperature of Examples 11 and 12 were within an acceptable range, e.g., 175-240 degrees Celsius. The moisture absorption of Example 11 was also minimal. The resins produced using a single monomer (Formulations 10 and 14) did not provide a suitable loss tangent, e.g., less than 0.003, for use in radomes.

Examples 15-19

Examples 15-19 show polymers produced using AroCy L-10 (monomer) and AroCy B-10 (monomer). Experimental procedures were the same as described in Examples 1-5. Table 4 shows the formulation and properties.

TABLE 4

| | Formulation No. | | | | |
|---|---|---|---|---|---|
| | 15 | 16 | 17 | 18 | 19 |
| Components | | | | | |
| AroCy L-10 (monomer) | 100 | 70 | 50 | 30 | 0 |
| AroCy B-10 (monomer) | 0 | 30 | 50 | 70 | 100 |
| Nonylphenol | 6 | 6 | 6 | 6 | 6 |
| Chromium acetylacetonate | 0.15 | 0.15 | 0.15 | 0.15 | 0.15 |
| Properties | | | | | |
| Dielectric constant (1 MHz) | 2.76 | 2.69 | 2.69 | 2.72 | 2.80 |

When using blends of certain monomers, the dielectric constant at 1 MHz is about 2.7 or higher. These results are consistent with certain monomer blends not providing resins with desirable physical properties.

Examples 20-22

Examples 20-22 show polymers made using three components, AroCy XU-366 (monomer)/XU-378 (oligomer)/B-10 (monomer). Experimental procedures were same as described in examples 1-5. Table 5 shows the formulation and properties.

TABLE 5

| | Formulation No | | |
|---|---|---|---|
| | 20 | 21 | 22 |
| Components | | | |
| AroCy XU-366 (monomer) | 40 | 30 | 30 |
| AroCy XU-378 (oligomer) | 30 | 30 | 20 |
| AroCy B-10 (monomer) | 30 | 40 | 50 |
| Nonylphenol | 6 | 6 | 6 |
| Chromium acetylacetonate | 0.15 | 0.15 | 0.15 |
| Properties | | | |
| Dielectric constant (1 MHz) | 2.60 | 2.69 | 2.72 |

The dielectric constant of formula 20, which included a majority by weight (40% by weight) of AroCy XU-366 (4,4'-(1,3-phenylenediisopropylidene)diphenylcyanate) monomer was lower than the other two formulations.

Examples 22-25 show polymers made using AroCy XU-366, thermoplastics, such as polyphenyleneoxide (PPO), and some other additives. Prepreg was made using quartz 4581 fabric and the resin content was ca. 40 wt. %. A twelve-ply laminate (6"×6") with zero direction was laid up with the prepreg and cured in a vacuum bag using following curing condition: 177° C. for 2 h followed by post-curing at 200° C. for 1 h. The flexural properties were measured using ASTM D790. Table 6 shows the formulation and properties.

TABLE 6

| | Formulation No. | | | |
|---|---|---|---|---|
| | 22 | 23 | 24 | 25 |
| Components | | | | |
| AroCy XU-366 | 100 | 100 | 100 | 100 |
| Noryl SA120 | 15 | 0 | 20 | 0 |
| Noryl SA9000 | 0 | 20 | 0 | 25 |
| Nonylphenol | 6 | 6 | 3 | 3 |
| Chromium acetylacetonate | 0.15 | 0.15 | 0.15 | 0.15 |
| Crodamide ER | 0 | 0 | 0.15 | 0.15 |
| Properties | | | | |
| Dielectric Constant (10 GHz) | 2.683 | 2.665 | 2.665 | 2.660 |
| Loss Tangent (10 GHz) | 0.0034 | 0.0031 | 0.0035 | 0.0030 |
| $T_g$ (° C.) | 171.0 | 158.8 | 165.0 | 170.8 |
| Flexural Strength (MPa) | 548 | 547 | 543 | 578 (710[a]) |
| Flexural Modulus (GPa) | 21 | 22 | 19 | 21 (22[a]) |

[a]Laminate was made using machine-coated prepreg, whereas the other laminates were made using hand-coated prepregs.

When introducing elements of the examples disclosed herein and the claims below, the articles "a," "an," "the" and "said" are intended to mean that there are one or more of the elements. The terms "comprising," "including" and "having" are intended to be open-ended and mean that there may be additional elements other than the listed elements. Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

The invention claimed is:

1. A prepreg comprising a plurality of plies coupled to each other, in which at least one of the plurality of plies comprises a substrate and a resin blend comprising 31-70 weight percent of a cyanate monomer and 70-30 weight percent of a cyanate ester oligomer to provide a cured resin comprising a dielectric constant of less than 2.7, a glass transition temperature of at least 150° C. and a moisture absorption of less than 1.5%, wherein the monomer is a compound of formulae (I)-(IX)

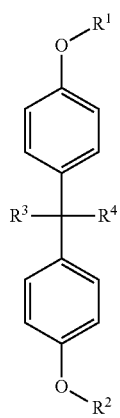

(I)

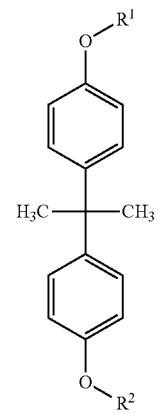

(II)

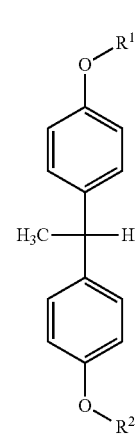

(III)

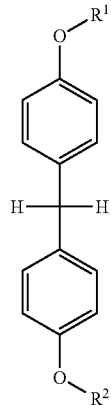

(IV)

(V)

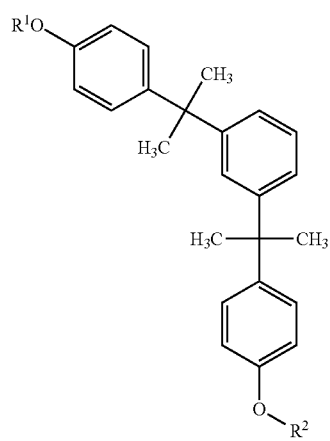

(VI)

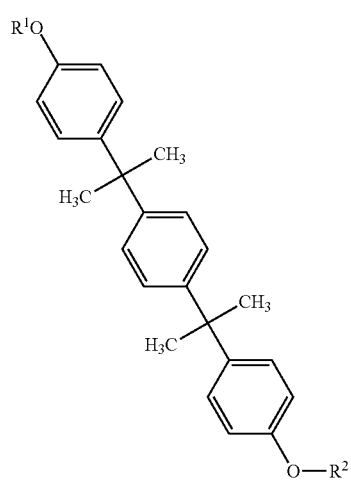

(VII)

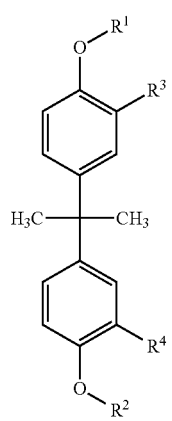

(VIII)

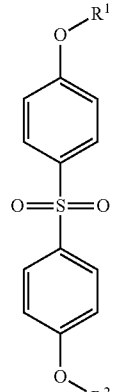

(IX)

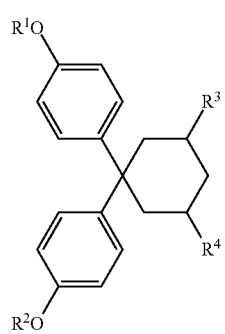

or mixtures of two or more cyanate monomers, wherein at least one of $R^1$ and $R^2$ is —CN and the other of $R^1$ and $R^2$ is selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl, and wherein $R^3$ and $R^4$, when present, are independently selected from hydrogen, —CN, —COOH, a hydrocarbon group comprising 1 to 6 carbon atoms, a hydrocarbonyl group comprising 1 to 6 carbon atoms, a halohydrocarbon group comprising 1 to 6 carbon atoms, a halohydrocarbonyl group comprising 1 to 6 carbon atoms and phenyl wherein the oligomer is a cyanate ester oligomer comprising two or more monomeric units each selected from a compound having the formula (I)-(IX); and wherein the oligomer is not a polymerization product of a compound of formula III, a compound of formula IV, or a mixture of a compound of formula III and a compound of formula IV.

2. The prepreg of claim 1, further comprising at least one phenol added to the resin blend.

3. The prepreg of claim 2, further comprising at least one metal catalyst added to the resin blend.

4. The prepreg of claim 1, in which the substrate comprises one or more of a woven fabric, a non-woven fabric, a ceramic, a plastic, a glass, a fiberglass, a nylon, a polyester, a polyethersulfone, an aramid, a polyethylene, a polypropylene, a polyolefin, a polyimide, a polyamide, a polyamide-imide, a polyphenylene sulfide, a carbon, a carbon black, a graphite, a diamond, a polybenzimidazole, a polybenzoxazole or a halocarbon.

5. The prepreg of claim 1, in which the cyanate monomer comprises a bisphenol dicyanate group and the cyanate ester oligomer comprises a diphenylcyanate group.

6. The prepreg of claim 1, wherein the resin blend comprises the cyanate monomer in an amount within the range of 50 wt. % to 70 wt. %, and the oligomer in an amount within the range of 30 wt % to 50 wt. %.

7. The prepreg of claim 1, wherein the cyanate monomer comprises a compound having the formula (V) or a compound having the formula (VI), and the oligomer comprises at least one monomeric unit selected from a compound having the formula (V)-(VI).

* * * * *